United States Patent
Shahrzad et al.

(10) Patent No.: US 9,466,023 B1
(45) Date of Patent: Oct. 11, 2016

(54) DATA MINING TECHNIQUE WITH FEDERATED EVOLUTIONARY COORDINATION

(71) Applicant: SENTIENT TECHNOLOGIES (BARBADOS) LIMITED, Belleville (BB)

(72) Inventors: Hormoz Shahrzad, Dublin, CA (US); Babak Hodjat, Dublin, CA (US)

(73) Assignee: SENTIENT TECHNOLOGIES (BARBADOS) LIMITED, Belleville, St. Michael (BB)

( * ) Notice: Subject to any disclaimer, the term of this patent is extended or adjusted under 35 U.S.C. 154(b) by 320 days.

(21) Appl. No.: 14/011,062

(22) Filed: Aug. 27, 2013

Related U.S. Application Data

(63) Continuation-in-part of application No. 12/267,287, filed on Nov. 7, 2008.

(60) Provisional application No. 61/075,722, filed on Jun. 25, 2008, provisional application No. 60/986,533, filed on Nov. 8, 2007.

(51) Int. Cl.
G06N 3/08 (2006.01)

(52) U.S. Cl.
CPC .................. G06N 3/086 (2013.01)

(58) Field of Classification Search
None
See application file for complete search history.

(56) References Cited

U.S. PATENT DOCUMENTS 5,930,780 A * 7/1999 Hughes .................. G06N 3/126 706/10
7,013,344 B2 3/2006 Megiddo
(Continued)

FOREIGN PATENT DOCUMENTS

JP 08-110804 A 4/1996
JP 2001325041 A 11/2001
(Continued)

OTHER PUBLICATIONS

Li, Xiaodong, and Michael Kirley. "The effects of varying population density in a fine-grained parallel genetic algorithm." Evolutionary Computation, 2002. CEC'02. Proceedings of the 2002 Congress on. vol. 2. IEEE, 2002.*
(Continued)

*Primary Examiner* — Kakali Chaki
*Assistant Examiner* — Daniel Pellett
(74) *Attorney, Agent, or Firm* — Haynes Beffel & Wolfeld LLP

(57) ABSTRACT

Roughly described, a data mining arrangement for developing high quality classifiers using an evolutionary algorithm, includes a plurality of "mid-chain" evolutionary coordinators, down-chain of a main (top-chain) evolutionary coordinator and up-chain of evolutionary engines. Multiple levels of mid-chain evolutionary coordinators can be used in a hierarchy, and the various branches of the hierarchy need not have equal length. Each evolutionary coordinator (other than the top-chain evolutionary coordinator) appears to its up-chain neighbor as if it were an evolutionary engine, though it does not actually perform any evolution itself. Similarly, each evolutionary coordinator (including the top-chain evolutionary coordinator) also appears to its down-chain neighbors as a top-chain evolutionary coordinator. Each mid-chain evolutionary coordinator maintains its own local candidate pool, reducing the load on the top-chain evolutionary coordinator pool, as well as reducing bandwidth requirements. Only the evolutionary engines perform actual testing of candidate individuals on training data.

44 Claims, 9 Drawing Sheets

(56) References Cited

U.S. PATENT DOCUMENTS

| | | | |
|---|---|---|---|
| 7,370,013 | B1 | 5/2008 | Aziz et al. |
| 7,444,309 | B2 | 10/2008 | Branke et al. |
| 2002/0019844 | A1* | 2/2002 | Kurowski ............. G06F 9/5072 709/201 |
| 2003/0158887 | A1* | 8/2003 | Megiddo ............... G06F 9/5072 709/201 |
| 2004/0210545 | A1* | 10/2004 | Branke ................. G06N 3/126 706/45 |
| 2005/0033672 | A1 | 2/2005 | Lasry et al. |
| 2005/0198103 | A1 | 9/2005 | Ching |
| 2007/0100907 | A1* | 5/2007 | Bayer ....................... G06F 8/65 |
| 2007/0143759 | A1 | 6/2007 | Ozgur et al. |
| 2007/0185990 | A1 | 8/2007 | Ono et al. |
| 2008/0228644 | A1 | 9/2008 | Birkestrand et al. |
| 2010/0182935 | A1 | 7/2010 | David |

FOREIGN PATENT DOCUMENTS

| | | |
|---|---|---|
| JP | 2003044665 A | 2/2003 |
| JP | 2004240671 A | 8/2004 |
| JP | 2004302741 A | 10/2004 |
| JP | 2007207173 A | 8/2007 |
| JP | 2007522547 A | 8/2007 |
| WO | 2005073854 A2 | 8/2005 |

OTHER PUBLICATIONS

Fidelis, Marcos Vinicius, Heitor S. Lopes, and Alex A. Freitas. "Discovering comprehensible classification rules with a genetic algorithm." Evolutionary Computation, 2000. Proceedings of the 2000 Congress on. vol. 1. IEEE, 2000.*

Dec. 23, 2008 International Search Report and Written Opinion for PCT/US2008/82876, 10 pp.

Kozo, J.R., "Genetic Programming: On the Programming of Computers by Means of Natural Selection", Dec. 1992, MIT Press, pp. 1-609.

Nov. 26, 2012 Extended EP SR for EP 08847214 (GNFN 2110-3), 9 pp.

Enee, Gilles et al., "Classifier Systems Evolving Multi-Agent System with Distributed Elitism," Proc. 1999 Congress on Evolutionary Computation (CEC'99) vol. 3:6, Jul. 1999, pp. 1740-1746.

Tanev I et al., "Scalable architecture for parallel distributed implementation of genetic programming on network of workstations," J. Systems Architecture, vol. 47, Jul. 2001, pp. 557-572.

Streichert F., "Introduction to Evolutionary Algorithms," paper to be presented Apr. 4, 2002 at the Frankfurt MathFinance Workshop Mar. 30, 2002, Frankfurt, Germany, XP55038571, 22 pp. (retrieved from the Internet: URL: http://www.ra.cs.uni-tuebingen.de/mitarb/streiche/publications/Introduction to E volutionary Algorithms.pdf).

Poli R et al., "Genetic Programmig: An introductory Tutorial and a Survey of Techniques and Applications," Univ. Essex School of Computer Science and Electronic Engineering Technical Report No. CES-475, Oct. 2007, 112 pp.

Jun. 16, 2011 Written Opinion from Singapore Patent Office in related application SG 201003127-6, 9 pp.

Apr. 20, 2012 Exam Report for related application AU 2008323758, 2 pp.

Sakauchi et al., UNIFINE: A Next Generation Financial Solution System of Nihon Unisys Ltd., Technology Review 'Unisys,' Japan, Nihon Unisys Ltd., Feb. 28, 2006, vol. 25, No. 4, pp. 14-15.

JP 2010-533295, Office Action dated Apr. 16, 2013, 12 pages.

* cited by examiner

INDIVIDUAL

| | INDIVIDUAL ID | EXPERIENCE | FITNESS | | | |
|---|---|---|---|---|---|---|
| RULE 1 | P/V 1.1 | P/V 1.2 | ... | P/V 1.M | OUTPUT 1 |
| RULE 2 | P/V 2.1 | P/V 2.2 | ... | P/V 2.M | OUTPUT 2 |
| RULE 3 | P/V 3.1 | P/V 3.2 | ... | P/V 3.M | OUTPUT 3 |
| RULE 4 | P/V 4.1 | P/V 4.2 | ... | P/V 4.M | OUTPUT 4 |
| RULE 5 | P/V 5.1 | P/V 5.2 | ... | P/V 5.M | OUTPUT 5 |

FIG. 3

TRAINING DATA

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

| DATE | SECURITY |
|---|---|
| Raw market data for entire day, e.g. tick data, trading volume data, price, etc.; and all other data needed to test performance of the individual on this security on this historical trading day | |

FIG. 4

DATA MINING TECHNIQUE WITH FEDERATED EVOLUTIONARY COORDINATION

CROSS-REFERENCE TO OTHER APPLICATIONS

This application is a Continuation-In-Part of U.S. application Ser. No. 12/267,287, filed Nov. 7, 2008, entitled "DISTRIBUTED NETWORK FOR PERFORMING COMPLEX ALGORITHMS", which application is a non-provisional of U.S. Application No. 61/075,722, filed Jun. 25, 2008, entitled "DISTRIBUTED NETWORK FOR PERFORMING COMPLEX ALGORITHMS", and a non-provisional of U.S. Application No. 60/986,533, filed Nov. 8, 2007, entitled "DISTRIBUTED NETWORK FOR PERFORMING COMPLEX ALGORITHMS". All of the above applications are incorporated herein by reference for their teachings.

The following patent applications are also incorporated herein for their teachings:
- U.S. application Ser. No. 12/769,589, filed Apr. 28, 2010, entitled "DISTRIBUTED EVOLUTIONARY ALGORITHM FOR ASSET MANAGEMENT AND TRADING";
- U.S. application Ser. No. 12/769,605, filed Apr. 28, 2010, entitled "CLASS-BASED DISTRIBUTED EVOLUTIONARY ALGORITHM FOR ASSET MANAGEMENT AND TRADING"; and
- U.S. application Ser. No. 13/184,307, filed Jul. 15, 2011, entitled "DATA MINING TECHNIQUE WITH EXPERIENCE-LAYERED GENE POOL".

BACKGROUND

The invention relates generally to data mining, and more particularly, to the use of genetic algorithms to extract useful rules or relationships from a data set for use in controlling systems.

In many environments, a large amount of data can be or has been collected which records experience over time within the environment. For example, a healthcare environment may record clinical data, diagnoses and treatment regimens for a large number of patients, as well as outcomes. A business environment may record customer information such as who they are and what they do, and their browsing and purchasing histories. A computer security environment may record a large number of software code examples that have been found to be malicious. A financial asset trading environment may record historical price trends and related statistics about numerous financial assets (e.g., securities, indices, currencies) over a long period of time. Despite the large quantities of such data, or perhaps because of it, deriving useful knowledge from such data stores can be a daunting task.

The process of extracting patterns from such data sets is known as data mining. Many techniques have been applied to the problem, but the present discussion concerns a class of techniques known as genetic algorithms. Genetic algorithms have been applied to all of the above-mentioned environments. With respect to stock categorization, for example, according to one theory, at any given time, 5% of stocks follow a trend. Genetic algorithms are thus sometimes used, with some success, to categorize a stock as following or not following a trend.

Evolutionary algorithms, which are supersets of Genetic Algorithms, are classifiers which are good at traversing chaotic search spaces. According to Koza, J. R., "Genetic Programming: On the Programming of Computers by Means of Natural Selection", MIT Press (1992), incorporated by reference herein, an evolutionary algorithm can be used to evolve complete programs in declarative notation. The basic elements of an evolutionary algorithm are an environment, a model for a genotype (referred to herein as an "individual"), a fitness function, and a procreation function. An environment may be a model of any problem statement. An individual may be defined by a set of rules governing its behavior within the environment. A rule may be a list of conditions followed by an action to be performed in the environment. A fitness function may be defined by the degree to which an evolving rule set is successfully negotiating the environment. A fitness function is thus used for evaluating the fitness of each individual in the environment. A procreation function generates new individuals by mixing rules with the fittest of the parent individuals. In each generation, a new population of individuals is created.

At the start of the evolutionary process, individuals constituting the initial population are created randomly, by putting together the building blocks, or alphabets, that form an individual. In genetic programming, the alphabets are a set of conditions and actions making up rules governing the behavior of the individual within the environment. Once a population is established, it is evaluated using the fitness function. Individuals with the highest fitness are then used to create the next generation in a process called procreation. Through procreation, rules of parent individuals are mixed, and sometimes mutated (i.e., a random change is made in a rule) to create a new rule set. This new rule set is then assigned to a child individual that will be a member of the new generation. In some incarnations, known as elitist methods, the fittest members of the previous generation, called elitists, are also preserved into the next generation.

In environments having a very large search space for optimal individuals, the computational demands of an evolutionary algorithm can become prohibitive. The present invention addresses this problem.

SUMMARY

The above-incorporated patent applications describe client/server arrangements for implementing an evolutionary data mining system. In some such arrangements, the pool of candidate individuals is distributed over a multitude of clients for evaluation. Each client continues to evaluate its own client-centric candidate pool using portions of data from a training database or data feed, which it may receive in bulk or recurrently. Individuals that satisfy one or more predefined conditions on a client computer are transmitted to the server to form part of a server candidate pool.

One bottleneck of many client/server arrangements arises where the server manages a single instance of the candidate pool, containing what is believed to be the best individuals so far developed. The server itself can be clustered for load balancing purposes, but all clustered servers still need to know the latest status of the pool, and can both read and write to it, and these operations can happen quite frequently under load. There is also a problem of bandwidth when too many clients are sending material up to the server cluster, which generally has to be physically near the place where the candidate pool is persisted (e.g., a database server).

In order to address this bottleneck, the functions of the server are federated. Roughly described, this is achieved by providing "mid-chain" evolutionary coordinators, and placing them between the main server (which in this arrangement can be called a "top-chain" evolutionary coordinator, or a "master" evolutionary coordinator) and the clients (which in this arrangement can be called "evolutionary engines"). Multiple levels of mid-chain evolutionary coordinators can be used in a hierarchy, and the various branches of the hierarchy need not have equal length. Each evolutionary coordinator (other than the top-chain evolutionary coordinator) appears to its up-chain neighbor as if it were an evolutionary engine, though it does not actually perform any evolution itself. Similarly, each evolutionary coordinator (including the top-chain evolutionary coordinator) also appears to its down-chain neighbors as a top-chain evolutionary coordinator. Each mid-chain evolutionary coordinator maintains its own local candidate pool, reducing the load on the top-chain evolutionary coordinator pool, as well as reducing bandwidth requirements.

In an embodiment, roughly described, each of the evolutionary engines includes a module which receives individuals to be tested and inserts them into the engine's local candidate pool; a candidate pool processor which tests individuals from the engine's local pool and updates their fitness estimates locally in dependence upon the tests; and a candidate harvesting module which forwards selected ones of the individuals from the engine's candidate pool to the engine's up-chain evolutionary coordinator.

Each of the mid-chain evolutionary coordinators includes a module which receives individuals to be tested and inserts them into the coordinator's pool; a delegation module which forwards selected ones of the individuals from the coordinator's pool to its down-chain units for testing; a competition module which receives back individuals from the down-chain units after testing, updates the fitness estimates of the received individuals locally in dependence upon the results of such testing, and selects individuals for discarding in dependence upon their updated fitness estimates; and a candidate harvesting module which forwards selected ones of the individuals from the coordinator's pool to the coordinator's up-chain evolutionary coordinator, which as previously mentioned may be the top-chain evolutionary coordinator or another mid-chain evolutionary coordinator.

The top-chain evolutionary coordinator includes a delegation module which forwards selected ones of the individuals from the top-chain coordinator's pool to its down-chain units for testing; a competition module which receives back individuals from the down-chain units after testing, updates the fitness estimates of the received individuals in the top-chain coordinator's candidate pool in dependence upon the results of such testing, and selects individuals for discarding in dependence upon their updated fitness estimates; and a candidate harvesting module which provides for deployment selected ones of the individuals from the coordinator's pool.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which:

FIG. 3 is a symbolic drawing of an individual in either the candidate pool or the production population of individuals in FIG. 1.

FIG. 4 is a symbolic drawing indicating how training data is organized in the training database in FIG. 1.

DETAILED DESCRIPTION

Figure 1:
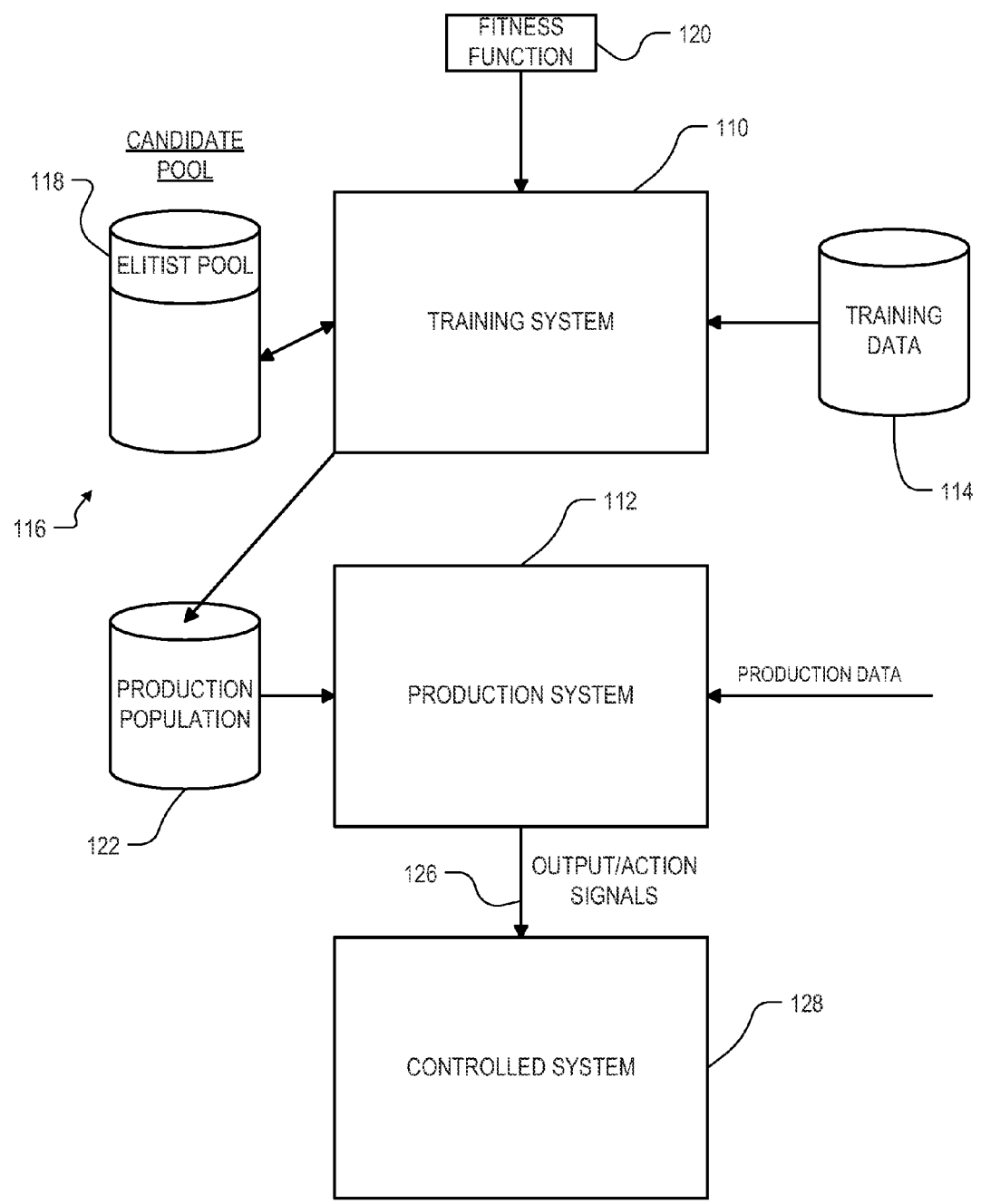
FIG. 1 is an overall diagram of an embodiment of a data mining system incorporating features of the invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Data mining involves searching for patterns in a database. The fittest individuals are considered to be those that identify patterns in the database that optimize for some result. In embodiments herein, the database is a training database, and the result is also represented in some way in the database. Once fit individuals have been identified, they can be used to identify patterns in production data which are likely to produce the desired result. In a healthcare environment, the individual can be used to point out patterns in diagnosis and treatment data which should be studied more closely as likely either improving or degrading a patient's diagnosis. In a financial assets trading environment, the individual can be used to detect patterns in real time data and assert trading signals to a trading desk. The action signals from an individual can be transmitted to the appropriate controlled system for execution.

One difference between the data mining environments of the embodiments described herein, and many other environments in which evolutionary algorithms can be applied, is that the fitness of a particular individual in the data mining environment usually cannot be determined by a single test of the individual on the data; rather, the fitness estimation itself tends to vary as it is tested on more and more samples in the training database. The fitness estimate can be inaccurate as testing begins, and confidence in its accuracy increases as testing on more samples continues. This means that if an individual is "lucky" early on, in the sense that the first set of samples that it was given for testing happened to have been in some sense "easy", then after only the first set of samples the individual will appear to be fitter than it actually is. If compared to other individuals that have much more experience, lucky individuals could displace individuals whose fitness estimates are lower but more realistic. If care is not taken, therefore, the algorithm will optimize for individuals that are lucky early on, rather than their actual fitness.

A solution to this problem is to consider individuals for the elitist pool only after they have completed testing on a predetermined number of samples, for example 1000 samples. Once an individual has reached that minimum threshold experience level, comparisons with other individuals are considered valid and can compete on the basis of fitness for a place in the elitist pool. The same problem can occur to a lesser degree even to individuals within the elitist pool, and a similar solution can be applied there as well. Thus in general, in embodiments herein, the elitist pool contains T layers numbered $L_1$-$L_T$, with T>1. The overall pool of candidate individuals also includes some that have not yet undergone sufficient numbers of tests to be considered for the elitist pool, and those individuals are considered herein to reside in a layer below the elitist pool, designed layer 0 ($L_0$). Each i'th one of the layers in $[L_0 \ldots L_{T-1}]$ contains only individuals with a respective range of testing experience $[ExpMin(L_i) \ldots ExpMax(L_i)]$, each $ExpMin(L_{i+1})>ExpMax(L_i)$. The minimum experience level of the bottom layer $L_0$ is 0, and the top layer $L_T$ has a minimum experience level $ExpMin(L_T)$ but no maximum experience level. Preferably, the experience ranges of contiguous layers are themselves contiguous, so that $ExpMin(L_{i+1})=ExpMax(L_i)+1$, for $0<=i<T$. Note that testing experience level is a significantly different basis on which to stratify individuals in an elitist pool than age in the sense of ALPS. ALPS means Age-Layered Population Structure, in which an individual's age is used to restrict competition and breeding between individuals in the population. In the parlance of ALPS, "age" is a measure of the number of times that an individual's genetic material has survived a generation (i.e., the number of times it has been preserved due to being selected into the elitist pool), rather than a measure of the number of training samples on which an individual has been tested.

In an embodiment, each layer i in the elitist pool (i.e. in layers $[L_1 \ldots L_T]$) is permitted to hold a respective maximum number of individuals, $Quota(L_i)$. The quota is chosen to be small enough to ensure competition among the individuals within the corresponding range of experience levels, but large enough to ensure sufficient diversity among the fit individuals that graduate to the next higher layer. Preferably the quota of each such layer is fixed, but in another embodiment it could vary. The quota of layer $L_0$ is not chosen based on these criteria, since the individuals in that layer do not yet compete. Preferably the number of layers T in the elitist pool is also fixed, but in another embodiment it can vary.

As each individual gains more experience, assuming it is not displaced within its current experience layer, it will eventually graduate to the next higher experience layer. If the next higher experience layer is not yet full, then the individual is added to that layer. If it is full, then the individual has to compete for its place in that layer. If it is fitter than the least fit individual in that layer, it will be accepted into that layer and the least fit individual will be discarded. If not, then the graduating individual will be discarded and the individuals in the next higher layer will be retained.

Either way, a space is opened in the current experience layer (the layer from which the individual is graduating). The open space means that the next individual graduating into the current experience layer from below will be accepted without having to compete for its place—thereby defeating a purpose of the elitist pool. To mitigate this problem, an embodiment introduces the concept of an elitist pool minimum fitness, which in one embodiment is set to the minimum fitness of the top layer. Thus in the embodiment, once the elitist pool minimum fitness is set, any individual being considered into the elitist pool can only be added if it has a fitness value above the elitist pool minimum fitness. Stated differently, once the top layer $L_T$ is full, individuals are not allowed to enter $L_1$ unless their fitness level is at least as high as the minimum fitness $FitMin(L_T)$ of the top layer $L_T$. In an alternative embodiment, the elitist pool minimum fitness is set at some other function f( ) that depends at least on $FitMin(L_T)$. In an embodiment, the elitist pool minimum fitness is not established until the top layer is full.

In an embodiment, individuals that have reached the top layer do not undergo further testing.

In one embodiment, individuals are harvested from the entire elitist pool for use against production data. In another embodiment, only individuals that have reached the top layer are subject to harvesting. In either embodiment, further selection criteria can be applied in the harvesting process. Such criteria is usually specific to the application environment, and can include, for example, fitness, consistency, and so on.

EXAMPLE EMBODIMENT

FIG. 1 is an overall diagram of an embodiment of a data mining system incorporating features of the invention. The system is divided into three portions, a training system 110, a production system 112, and a controlled system 128. The training system 110 interacts with a database 114 containing training data, as well as with another database 116 containing the candidate pool. As used herein, the term "database" does not necessarily imply any unity of structure. For example, two or more separate databases, when considered together, still constitute a "database" as that term is used herein. In particular, though candidate pool 116 may appear in FIG. 1 as a unitary structure, whereas in the federated embodiments described herein it is actually spread over multiple storage units. The candidate pool database 116 includes a portion 118 containing the elitist pool. The training system 110 operates according to a fitness function 120, which indicates to the training system 110 how to measure the fitness of an individual. The training system 110 optimizes for individuals that have the greatest fitness, however fitness is defined by the fitness function 120. The fitness function is specific to the environment and goals of the particular application. For example, the fitness function may be a function of the predictive value of the individual as assessed against the training data—the more often the individual correctly predicts the result represented in the training data, the more fit the individual is considered. In a financial asset trading environment, an individual might provide trading signals (e.g. buy, sell, hold current position, exit current position), and fitness may be measured by the individual's ability to make a profit, or the ability to do so while maintaining stability, or some other desired property. In the healthcare domain, an individual might propose a diagnosis based on patient prior treatment and current vital signs, and fitness may be measured by the accuracy of that diagnosis as represented in the training data.

The production system 112 operates according to a production population of individuals in another database 122. The production system 112 applies these individuals to production data 124, and produces outputs 126, which may be action signals or recommendations. In the financial asset trading environment, for example, the production data 124 may be a stream of real time stock prices and the outputs 126 of the production system 112 may be the trading signals or instructions that one or more of the individuals in production population 122 outputs in response to the production data 124. In the healthcare domain, the production data 124 may be current patient data, and the outputs 126 of the production system 112 may be a suggested diagnosis or treatment regimen that one or more of the individuals in production population 122 outputs in response to the production data 124. The production population 122 is harvested from the training system 110 once or at intervals, depending on the embodiment. Preferably, only individuals from elitist pool 118 are permitted to be harvested. In an embodiment, further selection criteria is applied in the harvesting process.

The controlled system 128 is a system that is controlled automatically by the signals 126 from the production system. In the financial asset trading environment, for example, the controlled system may be a fully automated brokerage system which receives the trading signals via a computer network (not shown in FIG. 1) and takes the indicated action. Depending on the application environment, the controlled system 128 may also include mechanical systems such as a engines, air-conditioners, refrigerators, electric motors, robots, milling equipment, construction equipment, or a manufacturing plant.

Figure 2:
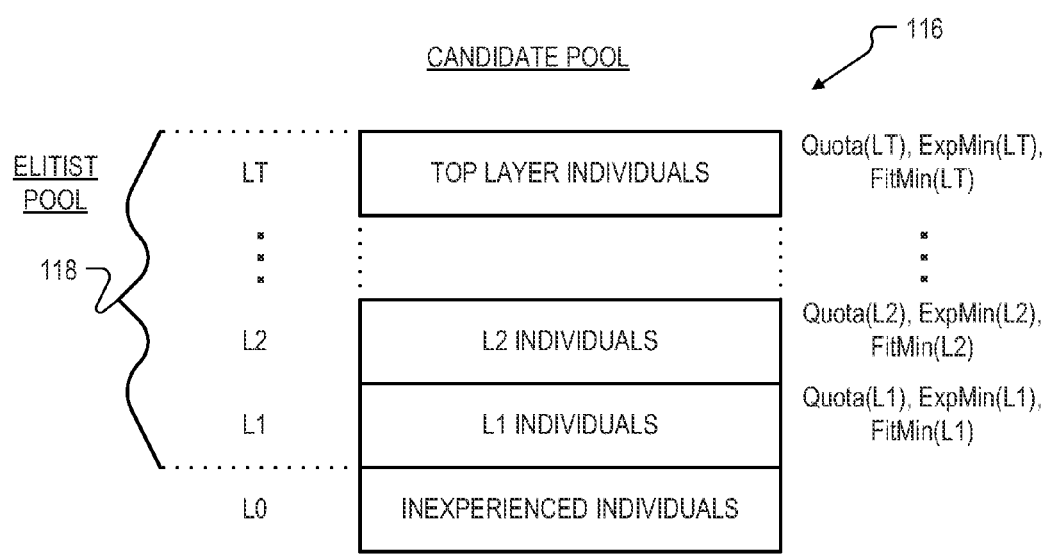
FIG. 2 is a symbolic drawing of the candidate pool in FIG. 1.

FIG. 2 is a symbolic drawing of the candidate pool 116 in FIG. 1. As can be seen, the individuals in the pool are stratified into T+1 "experience layers", labeled $L_0$ through $L_T$. The individuals in $L_0$ are very inexperienced (have been tested on only a relatively small number of samples in training data 114, if any), whereas the higher layers contain individuals in successively greater experience ranges. The layers $L_1$ through $L_T$ constitute the elitist pool 118 (FIG. 1). Each layer i in the elitist pool 118 has associated therewith three "layer parameters": a quota $Quota(L_i)$ for the layer, a range of experience levels $[ExpMin(L_i) \ldots ExpMax(L_i)]$ for the layer, and the minimum fitness $FitMin(L_i)$ for the layer. For example, an embodiment in the financial asset trading environment may have on the order of 40 or 50 layers in the elitist pool, each containing individuals with experience levels within a range on the order of 4000-5000 trials. The minimum experience level $ExpMin(L_1)$ may be on the order of 8000-10,000 trials, and each layer may have a quota on the order of 100 individuals.

In the embodiment of FIG. 2, the quotas for all the layers in the elitist pool 118 are equal and fixed. Neither is required in another embodiment. In addition, $ExpMin(L_0)=0$ in this embodiment. Also, as the experience ranges of the layers are contiguous, ExpMin of each layer can be inferred as one higher than ExpMax of the next lower layer, or ExpMax of each layer can be inferred as one lower than ExpMin of the next higher layer. Thus only the minimum experience level or the maximum experience level need be specified for each layer. In the embodiment, only the minimum experience levels are specified, and they are specified for layers $L_1$-$L_T$; in another embodiment only the maximum experience levels are specified, and they are specified for layers $L_0$-$L_{T-1}$. In yet another embodiment, the size of the range of experience layers assigned to all the layers is constant, and only one minimum or maximum experience level is specified in the layer parameters; the remainder are calculated algorithmically as needed. Other variations will be apparent.

The FitMin( ) values in FIG. 2 are not specified a priori. Rather, they are filled by copying from the fitness estimate associated with the least fit individual in each layer. Whenever the fitness estimate of the least fit individual is updated, and whenever the least fit individual itself is replaced, the FitMin( ) value associated with the layer is updated correspondingly. The FitMin( ) values are needed for comparing to the fitness estimation of individuals coming up from the next lower layer, and having them associated directly with each layer can simplify this comparison. In another embodiment, each layer can instead contain a pointer to the least fit individual in the layer, and the comparison method can obtain the layer minimum fitness from that individual itself. In general, each layer has associated with it an "indication" of the minimum fitness in the layer. As used herein, an "indication" of an item of information does not necessarily require the direct specification of that item of information. Information can be "indicated" in a field by simply referring to the actual information through one or more layers of indirection, or by identifying one or more items of different information which are together sufficient to determine the actual item of information. In addition, the term "identification" and its variants are used herein to mean the same as "indication".

In one embodiment, the experience layer in candidate pool 116 define separate regions of memory, and the individuals having experience levels within the range of each particular layer are stored physically within that layer. Preferably, however, the experience layers are only implied by the layer parameters and the individuals can actually be located anywhere in memory. In one embodiment, the individuals in candidate pool 116 are stored and managed by conventional database management systems (DBMS), and are accessed using SQL statements. Thus a conventional SQL query can be used to obtain, for example, the fitness estimate of the least fit individual in the highest layer. New individuals can be inserted into the candidate pool 116 using the SQL "insert" statement, and individuals being discarded can be deleted using the SQL "delete" statement. In another embodiment, the individuals in candidate pool 116 are stored in a linked list. In such an embodiment insertion of a new individual can be accomplished by writing its contents into an element in a free list, and then linking the element into the main linked list. Discarding of individuals involves unlinking them from the main linked list and re-linking them into the free list.

FIG. 3 is a symbolic drawing of an individual 310 in either the candidate pool 116 or the production population 122 of individuals. As used herein, an "individual" is defined by its contents. An individual created by procreation is considered herein to constitute a different individual than its parents, even though it retains some if its parents' genetic material. In this embodiment, the individual identifies an ID 312, its experience level 314, and its current fitness estimate 316. An individual represents a full solution-space in that it contains the "classification rules" 318 needed to classify an item of test data. Each rule contains one or more conditions 320 and an output 322 to be asserted if all the conditions in a given sample are true. During procreation, any of the conditions or any of the outputs may be altered, or even entire rules may be replaced. The individual's experience level 314 increments by one for each sample of the training data 114 on which it is tested, and its fitness estimate 316 is determined by fitness function 120, averaged (or otherwise combined) over the all the trials.

A rule is a conjunctive list of indicator-based conditions in association with an output. Indicators are the system inputs that can be fed to a condition. These indicators are represented in the training database 114, as well as in the production data 124. Indicators can also be introspective, for example by indicating the fitness estimate of the individual at any given moment. In the embodiment of FIG. 1, the individual's conditions are all specified as parameter/value ("P/V") pairs. That is, if in the current sample, the specified parameter has the specified value (or range of values), then the condition is true. Another embodiment can also include conditions which are themselves conditioned on other items (such as other conditions in the rule or in a different rule or the result of another entire one of the rules). Yet another embodiment can also include conditions or rules which are specified procedurally rather than as P/V pairs. Many other variations will be apparent.

In a financial asset trading embodiment, during training, an individual can be thought of as a virtual trader that is given a hypothetical sum of money to trade using historical data. Such trades are performed in accordance with a set of rules that define the individual thereby prompting it to buy, sell, hold its position, or exit its position. The outputs of the rules are trading action signals or instructions, such as buy, sell, exit or hold. Rules may also be designed to contain gain-goal and stop-loss targets, thus rendering the exit action redundant. A hold occurs when no rule in the individual is triggered, therefore, the individual effectively holds its current position. The indicators on which the rules are based can be, for example, a time increment ("tick"), or the closing price for a stock day.

The following code defines an example rule in terms of conditions and indicators, as well as the action asserted by the rule, in accordance with one embodiment of the present invention:

```
if (PositionProfit>=2% and !(tick=(-54/10000)%
   prev tick and MACD is negative)

and !(tick=(-119/10000)% prev tick and Position is
   long))

and !(ADX×100<=5052))

then SELL
``` where "and" represents logical "AND" operation, "!" represents logical "NOT" operation, "tick", "MACD" and "ADX" are stock indicators, "SELL" represents action to sell, and "PositionProfit" represents the profit position of the individual.

In a healthcare embodiment, an individual can be thought of as a set of rules predicting a patient's future state, given the patient's current and past state. The outputs of the rules can be proposed diagnoses or proposed treatment regimens that the individual asserts are appropriate given the conditions of the individual's rules. The indicators on which the rules are based can be a patient's vital signs, and past treatment and medication history, for example. An example rule is as follows:

```
if pulse>=120 and 18<=blood pressure[6]<20 and
   temp>=104 and surgery duration<22 and clamp
   on artery and medication=EB45 and last medi-
   cation>=60 and !white blood cell count [3]<-
   2.3 and !oxygen level [1]<-1.1-->>> then thromboembolism @ prob<=0.65
```

In an embodiment, an individual can also contain or identify a history of the separate fitness trials to which the individual has been subjected. Such a fitness history can be used to avoid re-testing the individual on the same data sample, or can be used to remove the effect of duplicate tests performed on an individual in different testing batteries before merging the fitness evaluations. It can also be used to help diversify the candidate pool, by comparing or weighting individuals not only on their overall fitness evaluations, but also on the way they reached their overall fitness evaluations. Fitness trial history also can be taken account when filtering the final pool of individuals for selection for deployment.

The training data is arranged in the database 114 as a set of samples, each with parameters and their values, as well as sufficient information to determine a result that can be compared with an assertion made by an individual on the values in the sample. In one embodiment, the result is explicit, for example a number set out explicitly in association with the sample. In such an embodiment, the fitness function can be dependent upon the number of samples for which the individual's output matches the result of the sample. In another embodiment, such as in the financial asset trading embodiment, the result may be only implicit. For example, the sample may include the price of an asset at each tick throughout a trading day, and the training system 110 must hypothetically perform all the trading recommendations made by the individual throughout the trading day in order to determine whether and to what extent the individual made a profit or loss. The fitness function can be dependent upon the profit or loss that the individual, as a hypothetical trader, would have made using the tick data for the sample.

FIG. 4 is a symbolic drawing indicating how the training data is organized in the database 114. The illustration in FIG. 4 is for the financial asset trading embodiment, and it will be understood how it can be modified for use in other environments. Referring to FIG. 4, three samples 410 are shown. Each sample includes a historical date, an identification of a particular security or other financial asset (such as a particular stock symbol), and raw historical market data for that financial asset on that entire trading day, e.g. tick data, trading volume data, price, etc.; and all other data needed to test performance of the individual's trading recommendations on this asset on this historical trading day. In another embodiment, a sample can contain tick data for a different time interval, which may be shorter or longer than one trading day.

Federated Client/Server Arrangement

In some environments, the training data used to evaluate an individual's fitness can be voluminous. Therefore, even with modern high processing power and large memory capacity computers, achieving quality results within a reasonable time is often not feasible on a single machine. A large candidate pool also requires a large memory and high processing power. In one embodiment, therefore, a federated client/server model is used to provide scaling in order to achieve high quality evaluation results within a reasonable time period.

Figure 5:
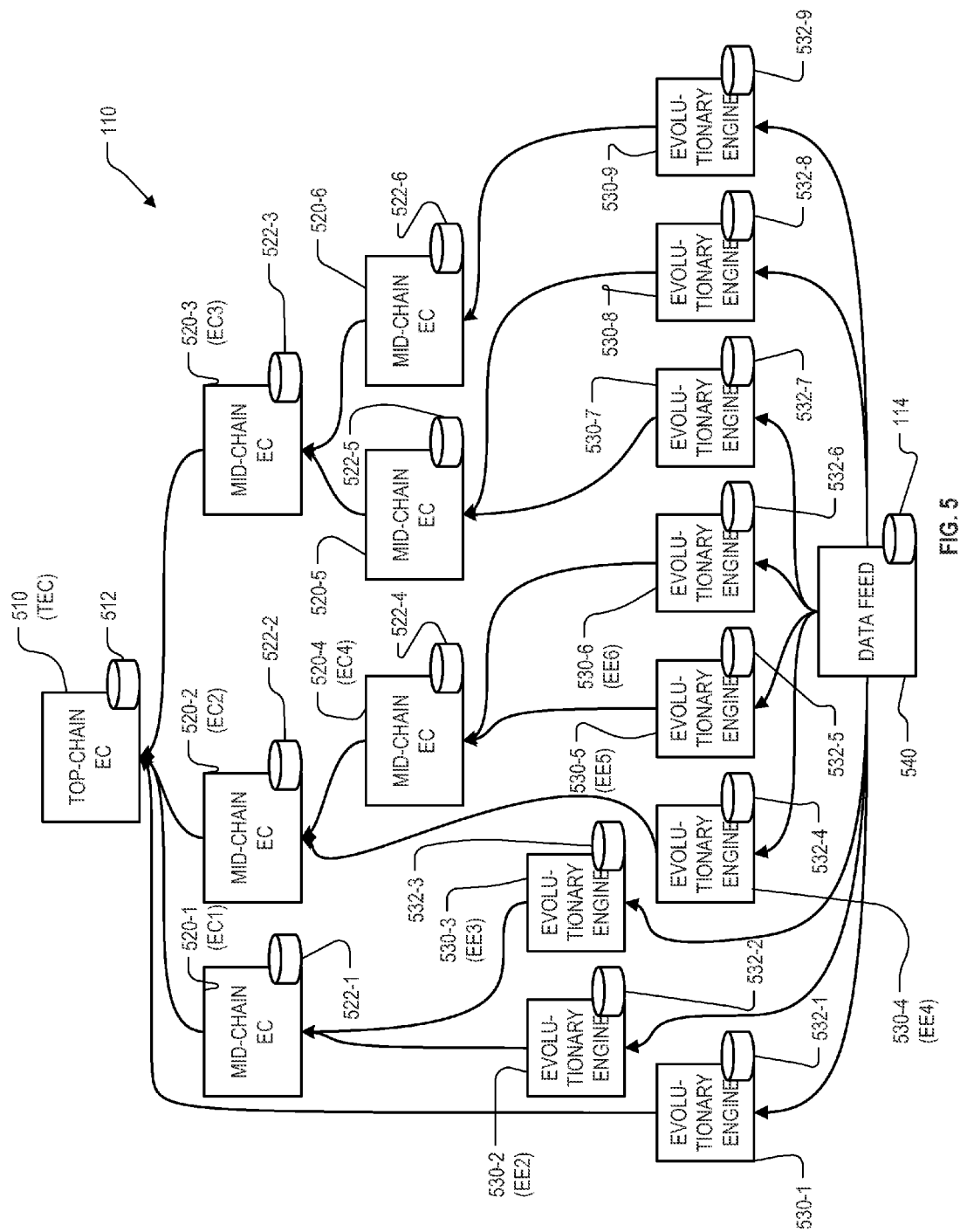
FIG. 5 is a symbolic diagram of training system of FIG. 1.

FIG. 5 is a symbolic diagram of training system 110. It comprises a top-chain evolutionary coordinator (EC) 510, which is also sometimes referred to herein as the master EC. Top-chain EC 510 maintains the master candidate pool 512.

Down-chain from the top-chain EC 510 is a set of mid-chain EC's 520-1 through 520-6 (collectively 520). Specifically, mid-chain EC's 520-1 through 520-3 are immediately down-chain from top-chain EC 510. Mid-chain EC 520-4 is immediately down-chain from mid-chain EC 520-2, and mid-chain EC's 520-5 and 520-6 are each immediately down-chain from mid-chain EC 520-3. Each of the mid-chain EC's 520 maintains its own local candidate pool 522-1 through 522-6, respectively (collectively 522).

Down-chain from the mid-chain EC's 520 are a plurality of evolutionary engines (EE's) 530-1 through 530-9 (collectively 530). Specifically, EE 530-1 is immediately down-chain from top-chain EC 510, and EE's 530-2 and 530-3 are each immediately down-chain from mid-chain EC 520-1. EE 530-4 is immediately down-chain from mid-chain EC 520-2, and EE's 530-5 and 530-6 are each immediately down-chain from mid-chain EC 520-4. EE's 530-7 and 530-8 are each immediately down-chain from mid-chain EEC 520-5, and EE 530-9 is immediately down-chain from mid-chain EEC 520-6. Like the EC's 520, each of the EE's 530 maintains its own local candidate pool 532-1 through 532-6, respectively (collectively 532).

Each EE 530 further has a communication port through which it can access one or more data feed servers 540, which retrieve and forward training samples from the training database 114. Alternatively, although not shown, the training samples may be supplied from data feed server 540 to the EE's 530 via one or more of the EC's 520. The data feed server 540 can also be thought of as simply a port through which the data arrives or is retrieved. Each of the EC's 510 and 520 maintains a local record of the IP address and port number at which each of its immediate down-chain units receives individuals delegated for evaluation, and delegating an individual to a particular one of the down-chain units for evaluation involves transmitting the individual (or an identification of the individual) toward the IP address and port number of the particular unit.

The EE's 530, and in some embodiments one or more of the EC's 520 as well, are volunteers in the sense that they can come and go without instruction from the up-chain neighboring units. When an EC 520 joins the arrangement, it receives the IP address and port number of its immediately up-chain neighbor, and the minimum experience level acceptable to the up-chain neighbor for candidates being sent up from the new EC 520. EE's 530 joining the arrangement receive that information plus the IP address and port number of data feed server 540. This information can be sent by any server that manages the hierarchy of evolutionary units in the system. In one embodiment that can be the top-chain evolutionary coordinator 510, whereas in another embodiment it can be a separate dedicated management server (not shown).

As used herein, the terms down-chain and up-chain are complimentary: if a second unit is down-chain from a first unit, then the first unit is up-chain from the second unit, and vice-versa. In addition, the terms "immediately" up-chain and "immediately" down-chain preclude an intervening evolutionary unit, whereas the terms up-chain and down-chain themselves do not. Even "immediately", however, does not preclude intervening components that are not evolutionary units. Also as used herein, the term "evolutionary unit" includes both evolutionary coordinators and evolutionary engines, and the term "evolutionary coordinator" includes both mid-chain evolutionary coordinators and the top-chain evolutionary coordinator.

In broad overview, all the work in testing of candidate individuals on training data is performed by the EE's 530. The EE's also generate their own initial sets of individuals, enforce competition among the individuals in their own respective candidate pools 532, and evolve their best performing candidates by procreation. The EC's, on the other hand, perform no testing. Instead they merely coordinate the activities of their respective down-chain units. Each evolutionary unit that has an up-chain neighbor reports up its best performing candidates to its up-chain EC, and also receives additional candidates from its up-chain EC for further testing. Each evolutionary unit that has a down-chain neighbor (i.e. each EC in FIG. 5) receives individuals from its respective down-chain units which the down-chain units had considered top performers, and requires the received individuals to compete for entry into the EC's own local candidate pool 522. If a received candidate is one which the EC had previously sent down to the down-chain unit for further testing, then the EC first updates its local understanding of the fitness of the individual prior to the competition. Each EC also sends down candidates from its own local pool for further testing as required. At various times, like the EE's, each EC harvests individuals from its own local pool which the EC considers to be its top performers. If the EC is a mid-chain EC 520, then it sends its harvested individuals to its up-chain EC, which may be the top-chain EC 510 or another mid-chain EC 520. If the EC is the top-chain EC 510, then it sends its harvested individuals for deployment.

It can be seen from FIG. 5 that the branches of the hierarchy of EC's can be very non-uniform in length and spread. A given branch can contain as few as zero mid-chain EC's 520, or as many as ten or more in a given embodiment. A given EC also can support as few as one down-chain unit or as many as ten or more, and some can be EE's 530 while others are other mid-chain EC's 520. This flexibility is facilitated by the rule that each evolutionary unit appears to its immediately up-chain neighboring unit, if it has one, as if it were an evolutionary engine; and appears to its immediately down-chain neighboring units, if it has any, as if it were a top-chain evolutionary coordinator.

Moreover, each of the evolutionary units in FIG. 5 can itself be a cluster of machines rather than just one. It can also be physical or virtual or, in the case of a cluster, partially physical and partially virtual. As a cluster, an evolutionary unit still appears to its up-chain and down-chain units as a single evolutionary engine or evolutionary coordinator as desired, so that the up-chain and down-chain units do not need to know that it is not a simple computer system. For example, one of the mid-chain coordinators can itself be made up of its own internal hierarchy of a top-chain coordinator and one or more mid-chain coordinators, thereby forming a nested arrangement. Similarly, an evolutionary engine can be made up of its own internal hierarchy of units, such as an internal top-chain coordinator up-chain of one or more internal evolutionary engines, with or without a level of internal mid-chain coordinators.

Still further, in the embodiment of FIG. 5, each evolutionary unit has only one immediately up-chain unit. This is so that when a unit harvests an individual and forwards it up-chain, it will not improperly return the individual to an up-chain unit different from the one that delegated it. Another embodiment may have no such restriction, allowing a given evolutionary unit to have more than one immediately up-chain unit. For example, this might be accomplished by associating, with each individual delegated to another unit in the hierarchy, an indication of the unit to which it should be returned after testing. For new individuals created by a unit having more than one immediately up-chain unit (or created by a unit down-chain from a unit having more than one immediately up-chain unit), the arrangement can implement some predetermined algorithm (e.g. a single default, round robin, or random) for determining to which up-chain unit the individual should be sent after testing and harvesting. Numerous additional variations will be apparent to the reader.

In the arrangement of FIG. 5, scaling is carried out in two dimensions, namely in pool size as well as in evaluation of the same individual to generate a more diverse candidate pool so as to increase the probability of finding fitter individuals. The candidate pool is distributed over a multitude of EE's 530 for evaluation. Each EE evaluates its own local candidate pool using data from training database 114, and individuals that satisfy one or more predefined conditions on an EE 530 are transmitted up-chain to form part of the candidate pool in its up-chain EC.

Distributed processing of individuals also may be used to increase the speed of evaluation of a given individual. To achieve this, individuals that are returned to an EC after some testing, but additional testing is desired, may be sent back (delegated) from the EC to a multitude of down-chain units for further evaluation. The evaluation result achieved by the down-chain units (sometimes referred to herein as partial evaluation) for an individual is transferred back to the delegating EC. The EC merges the partial evaluation results of an individual with that individual's fitness estimate at the time it was delegated to arrive at an updated fitness estimate for that individual as regards the EC's local candidate pool. For example, assume that an individual has been tested on 500 samples and is sent from a particular EC to, for example, two down-chain units (which may be an EE 530 or another mid-chain EC 522, or one of each), each instructed to test the individual on 100 additional samples. Each of the down-chain units further tests the individual on the additional 100 samples (the mid-chain EC 520 further delegating that task to its further down-chain units), and reports its own view of the fitness estimate to the requesting up-chain particular EC. The particular EC, having received back the individual with the requested additional testing experience, combines these two estimates with the individual's fitness estimate at the time it was sent to the two down-chain units, to calculate an updated fitness estimate for the individual as viewed by the particular EC. The combined results represent the individual's fitness evaluated over 700 days. In other words, the distributed system, in accordance with this example, increases the experience level of an individual from 500 samples to 700 samples using only 100 different training samples at each evolutionary unit. A distributed system, in accordance with the present invention, is thus highly scalable in evaluating its individuals.

In an embodiment, the top-chain EC 510 maintains locally the master candidate pool. It is experience layered as in FIG. 2, but it does not maintain any candidate individuals below its layer $L_1$. New individuals are created by evolutionary engines 530, and they are not reported to the top-chain EC 510 until they have been tested on sufficient numbers of samples to qualify for the elitist pool 118 of the top-chain EC 510.

Advantageously, EE's 530 are enabled to perform individual procreation locally, thereby improving the quality of their individuals. Each EE 530 is a self-contained evolution device, not only evaluating the individuals in its own pool, but also creating new generations of individuals and moving the evolutionary process forward locally. Thus EE's 530 maintain their own local candidate pool which need not match each other's or that of any of the ECs. Since the EE's 530 continue to advance with their own local evolutionary process, their processing power is not wasted even if they are not in constant communication with their up-chain neighbors. Once communication is reestablished with the up-chain neighbors, EE's 530 can send in their fittest individuals up-chain and receive additional individuals from their up-chain neighbors for further testing.

New individuals created by the EE's 530, both during initialization and by procreation, are not reported up-chain until they have been tested on sufficient numbers of samples to qualify for the elitist pool of the up-chain unit. The number of individuals created by the EE's 530 may vary depending on the memory size and the CPU processing power of the EE's. An EE 530 may be, in addition to the variations mentioned above, a laptop computer, a desktop computer, a cellular/VoIP handheld computer or smart phone, a tablet computer, distributed computer, or the like. An example system may have hundreds of thousands of EE's 530, and an EE 530 may have on the order of 1000 individuals for evaluation.

Figure 6:
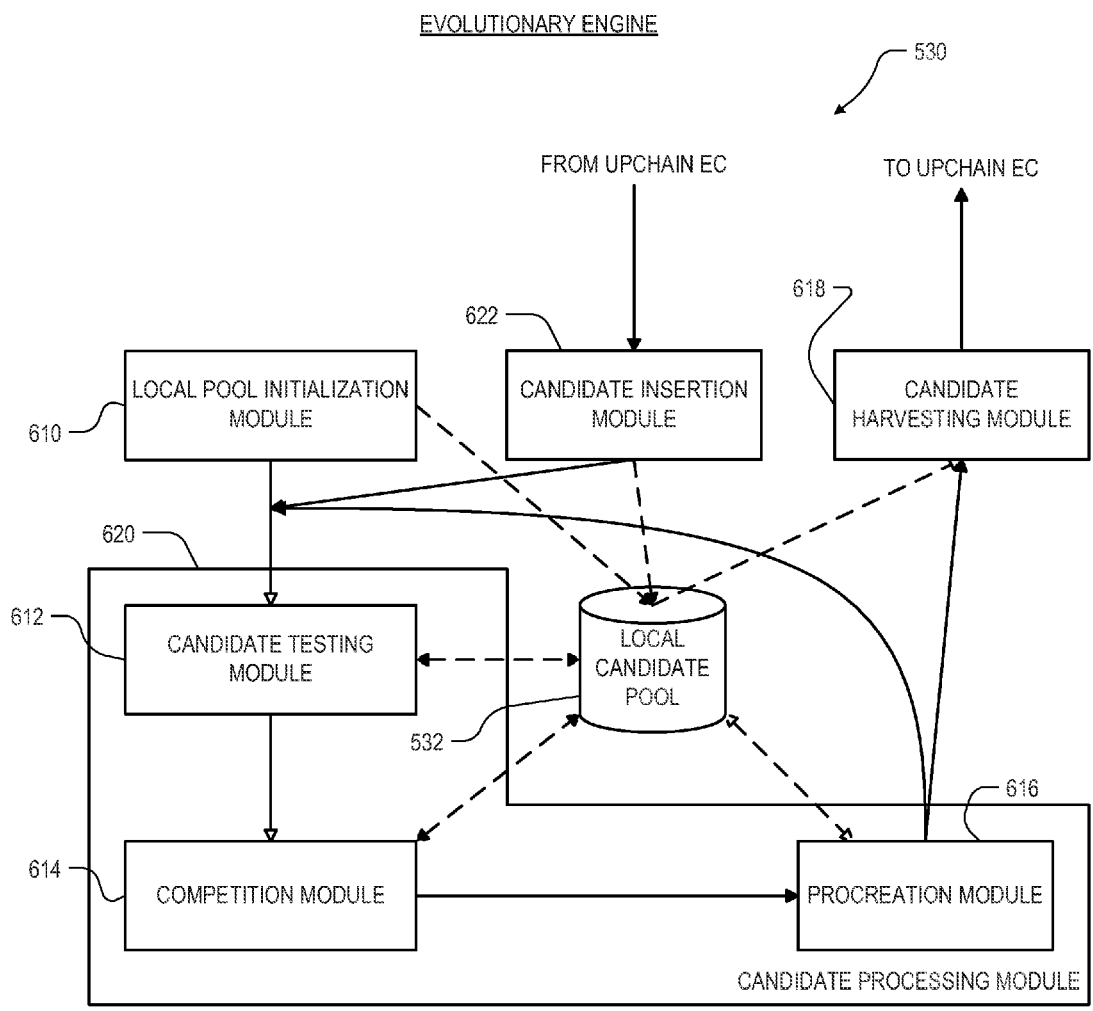
FIG. 6 illustrates various modules that can be used to implement the functionality of an evolutionary engine of FIG. 5.

FIG. 6 illustrates various modules that can be used to implement the functionality of an evolutionary engine 530. The EE's local candidate pool 532 is also shown in the drawing. Generally, solid lines indicate process flow, and broken lines indicate data flow. The modules can be implemented in hardware or software, and need not be divided up in precisely the same blocks as shown in FIG. 6. Some can also be implemented on different processor cores or computers, or spread among a number of different processors or computers. In addition, it will be appreciated that some of the modules can be combined, operated in parallel or in a different sequence than that shown in FIG. 6 without affecting the functions achieved. Also as used herein, the term "module" can include "sub-modules", which themselves can be considered herein to constitute modules. In particular, the candidate testing module 612, competition module 614, and procreation module 616 are also considered herein to be sub-modules of a candidate pool processing module 620. The blocks in FIG. 6 designated as modules can also be thought of as flowchart steps in a method. These comments also apply to FIGS. 7 and 8.

Though not required in all embodiments, in the embodiment of FIG. 5, each of the evolutionary units 510, 520 and 530 implements its own local layered candidate pool as described above with respect to FIG. 2. Unlike the top-chain EC 510, EE's 530 do maintain and develop in their local candidate pools 532 candidates that are in the respective $L_0$ layer, and do not prevent further testing of individuals that have reached the top layer $L_T$ of the local candidate pool 532. Candidate pool 532 has multiple experience layers with experience ranges that are below that of the first experience layer ($L_1$) of the candidate pool of the EE's immediately up-chain EC 520. The candidate pool 532 has experience layers with experience ranges extending consecutively from zero up to and including at least $L_1$ of the EE 530's immediately up-chain EC 520. In one embodiment, the experience layers in candidate pool 532 extend all the way up to and including the experience range of the top layer $L_T$ of the immediately up-chain EC 520. However, since EE's 530 are often resource constrained, in the embodiment of FIG. 5 a compromise is implemented. In the compromise, the experience layers in candidate pool 532 in one or more, or all, of the EE's 530 in the embodiment of FIG. 5 extend up to and including the experience range of the second layer $L_2$ of the EE 530's immediately up-chain EC 520. Said another way, all of the experience layers in the candidate pool 532, other than $L_T$ and $L_{T-1}$ of the candidate pool 532, are within $L_0$ of the EE 530's immediately up-chain EC 520. At a minimum, preferably, the minimum experience level of an EE 530's $L_T$ is at least as high as the minimum experience level of $L_1$ the EE 530's immediately up-chain EC 520.

Individuals are harvested from all layers having a minimum experience level that is at least as high as that of the first layer $L_1$ of the immediately up-chain EC 520. If the experience ranges of $L_T$ (and $L_{T-1}$) do not match experience ranges of layers in the immediately up-chain EC 520, then the rule applied is that only individuals whose testing experience level is at least as high as the minimum testing experience level of $L_1$ of the immediately up-chain EC 520 can be harvested.

In the embodiment of FIG. 5, because the candidate pools 532 of the EE's 530 maintain only one or two experience layers at or above the lowest testing experience layer of their immediately up-chain EC 520, and because candidates are harvested and reported up to the up-chain EC 520 only from those layers, it will be typical that any individuals that are delegated back down to this EE 530 will have higher experience levels than most layers in the EE 530. After a battery of trials, these individuals will compete for a space in the local candidate pool 532 only with individuals in layers $L_T$ and $L_{T-1}$ of the local candidate pool 532, which can sometimes cover a very large range of testing experience. Thus there is a significant likelihood that such individuals will be competing with individuals that have far less testing experience, a mismatch which experience layering is intended to address. The mismatch is tolerated for EE's 530 as a tradeoff for the resource-limited restriction on the number of upper experience layers supported by EE's 530.

Preferably the candidate pool 532 in the EE's 530 are implemented using linked lists, whereas the candidate pools 512 and 522 in the EC's are implemented using a DBMS, both as previously described.

Referring to FIG. 6, the candidate pool 532 is initialized by pool initialization module 610, which creates an initial set of candidate individuals in $L_0$ of the candidate pool 532. These individuals can be created randomly, or by some other algorithm, or in some embodiments a priori knowledge is used to seed the first generation. In another embodiment, individuals from prior runs can be borrowed to seed a new run. At the start, all individuals are initialized with an experience level of zero and a fitness estimate that is undefined. Evolutionary engine 530 also receives candidate individuals from an up-chain evolutionary coordinator 520 or 522 for further testing. These individuals all originated from one of the evolutionary engines 530, which may be different than the one to which it is now being sent. The individual is received by candidate insertion module 622 and inserted into the local candidate pool 532. These individuals retain their experience & fitness estimates as received from the up-chain evolutionary coordinator, and do not compete with the other individuals in the local candidate pool 532 until after a battery of trials (which further refines their fitness estimates and increases their experience levels prior to the competition).

Candidate testing module 612 next proceeds to test the population in the candidate pool 532 on the training data 114. Unlike the top-chain EC 510, the EE 530 tests all individuals in the local candidate pool 532 (of which there are none initially), not just those below the local top layer $L_T$. Each individual undergoes a battery of tests or trials on the training data 114, each trial testing the individual on one sample 410. In another embodiment, one sample consists of information about many securities rather than just one. In one embodiment, each battery might consist of only a single trial. Preferably, however, a battery of tests is much larger, for example on the order of 1000 trials. In one embodiment, at least the initial battery of tests includes at least ExpMin ($L_1$) trials for each individual, to enable the initial individuals to qualify for consideration for the first layer of the elitist pool in local candidate pool 532. Note there is no requirement that all individuals undergo the same number of trials.

After the tests, candidate testing module 612 updates the local fitness estimate associated with each of the individuals tested.

In an embodiment, the fitness estimate may be an average of the results of all trials of the individual. In this case the "fitness estimate" can conveniently be indicated by two numbers: the sum of the results of all trials of the individual, and the total number of trials that the individual has experienced. The latter number may already be maintained as the experience level of the individual. The fitness estimate at any particular time can then be calculated by dividing the sum of the results by the experience level of the individual. In an embodiment such as this, "updating" of the fitness estimate can involve merely adding the results of the most recent trials to the prior sum. It will be appreciated that the fitness estimate maintained in the local candidate pool 532 represents the individual's fitness as viewed by the current evolutionary engine 530. If the individual had been sent down from a mid-chain EC 522 (rather than having been formed originally by the EE 530), then that EC's view of the individual's fitness may well differ. It is for this reason that fitness is sometimes referred to herein as being a fitness version that is "centric." to one unit or another (i.e. as viewed by that unit).

Next, competition module 614 updates the local candidate pool 532 contents in dependence upon the updated fitness estimates. The operation of module 614 is described in more detail below, but briefly, the module considers individuals from lower layers for promotion into higher layers, selects individuals for discarding that do not meet the minimum individual fitness of their target layer, and selects individuals for discarding that have been replaced in a layer by new entrants into that layer. Local candidate pool 532 is updated with the revised contents. If an individual marked for discarding had been delegated to the EE 530 for testing, then its selection for discarding is reported back to the up-chain delegating EC 510 or 520 before being deleted from the local candidate pool 532. If not, then it is simply deleted from the local candidate pool 532.

After the candidate pool 532 has been updated, a procreation module 616 evolves a random subset of them. Only individuals in the local elitist pool (i.e. above layer $L_0$) are permitted to procreate. Any conventional or future-developed technique can be used for procreation. In an embodiment, conditions, outputs, or rules from parent individuals are combined in various ways to form child individuals, and then, occasionally, they are mutated. The combination process for example may include crossover—i.e., exchanging conditions, outputs, or entire rules between parent individuals to form child individuals. New individuals created through procreation begin with an experience level of zero and with a fitness estimate that is undefined. These individuals are placed in $L_0$ of the local candidate pool 532. Preferably, after new individuals are created by combination and/or mutation, the parent individuals are retained. In this case the parent individuals also retain their experience level and fitness estimates, and remain in their then-current local elitist pool layers. In another embodiment, the parent individuals are discarded.

After procreation, candidate testing module 612 operates again on the updated candidate pool 532. The process continues repeatedly.

Sometime after the top layer of the local candidate pool 532 is full, individuals can be harvested for forwarding to the EE's up-chain EC. Candidate harvesting module 618 retrieves individuals for that purpose. In one embodiment, candidate harvesting module 618 retrieves individuals periodically, whereas in another embodiment it retrieves individuals only in response to user input. Preferably the candidate harvesting module 618 maintains a list of individuals ready for reporting up. It awakens periodically, and forwards all the individuals on the list up-chain. As mentioned, candidate harvesting module 618 preferably selects only from the layer or layers in the local candidate pool 532 whose minimum experience levels are at least as high as the minimum experience level of the lowest level ($L_1$) maintained by the immediately up-chain EC 510 or 520 (or only from among those individuals with at least as high an experience level). Candidate harvesting module 618 also can apply further selection criteria as well in order to choose desirable individuals.

Figure 7:
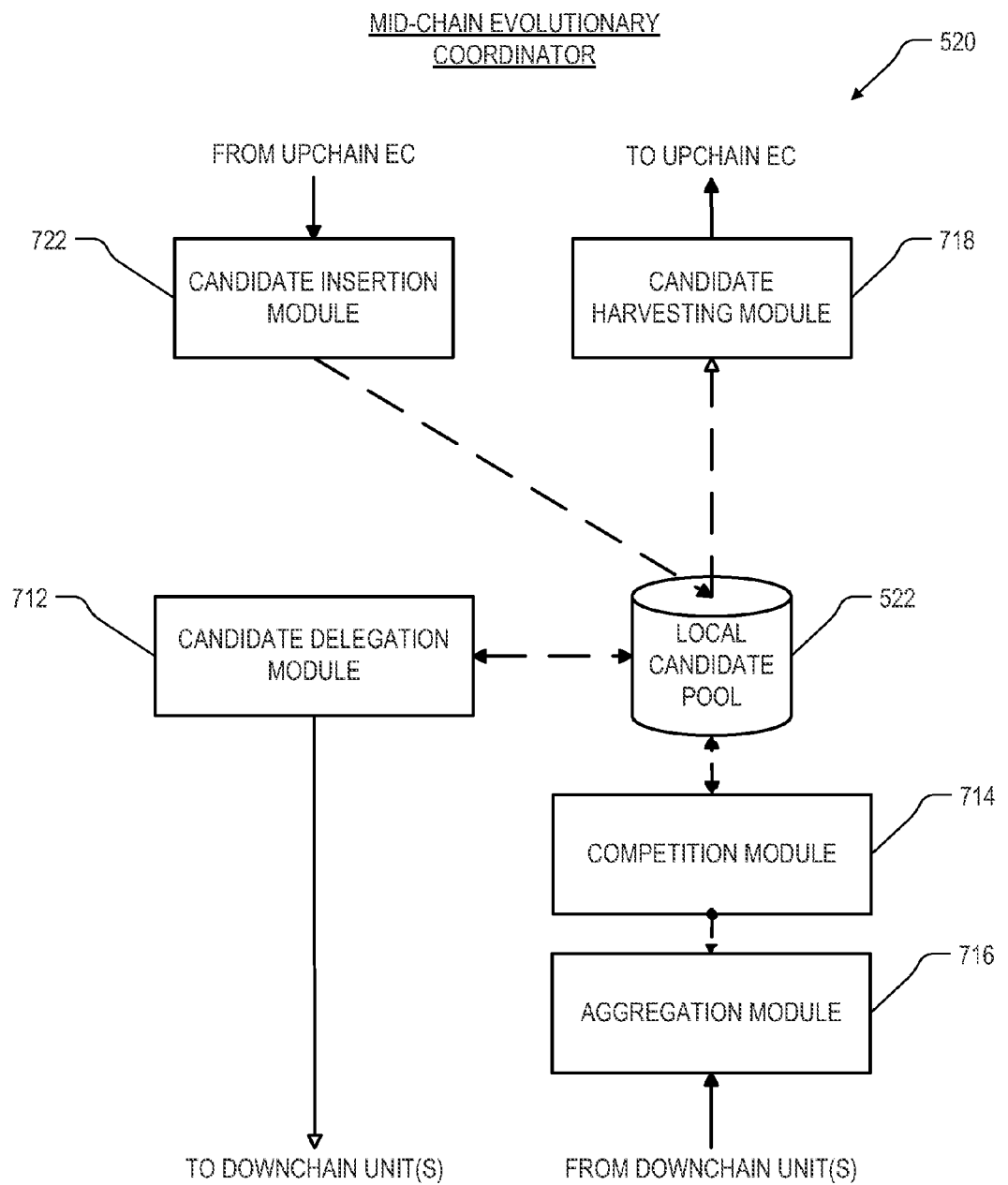
FIG. 7 illustrates various modules that can be used to implement the functionality of a mid-chain evolutionary coordinator of FIG. 5.

FIG. 7 illustrates various modules that can be used to implement the functionality of a mid-chain evolutionary coordinator 520. The EC's local candidate pool 522 is also shown in the drawing. Most of the modules shown in FIG. 7 can in some embodiments operate asynchronously from each other.

As with the evolutionary engines 530, mid-chain evolutionary coordinators 520 also implement a respective local layered candidate pool as described above with respect to FIG. 2. The number of layers in the elitist pool, and the minimum and maximum experience levels of such layers, need not be the same in all the mid-chain EC's, nor need they be the same as those in the evolutionary engines 530, which also need not be the same as each other. Preferably, though, they span a generally higher set of experience levels than the immediately down-chain unit. Like the top-chain EC 510, the local candidate pool 522 of a mid-chain EC 520 does not maintain any candidates in its respective $L_0$, but like the EE's 530, it does not prevent further testing of candidates in its top layer $L_T$.

More specifically, the local candidate pool 522 of each mid-chain evolutionary coordinator 520 maintains multiple experience layers within the testing experience range of its immediately up-chain unit's $L_0$, and also maintains experience layers having testing experience ranges extending upward to and including that of the immediately up-chain unit's $L_T$. The testing experience layers have consecutively increasing experience ranges from $L_1$ of the local candidate pool 522 through $L_T$ of the local candidate pool. Another embodiment could include experience layers with even higher testing experience ranges, but this is typically unnecessary. In general, therefore, the minimum testing experience level of $L_T$ in the candidate pool 522 of each mid-chain EC 520 is at least as high as the minimum testing experience level of $L_T$ in the candidate pool of its immediately up-chain EC, and thus is also at least as high as the minimum testing experience level of $L_T$ in the candidate pool 512 of the top-chain EC 510. Also, typically the minimum testing experience level of $L_1$ of the local candidate pool 522 increases for EC's 520 that are nearer in the hierarchy to the top-chain EC 510, though this is not essential.

Like the EE's 530, individuals are harvested from mid-chain EC's 520 only from the layer or layers in the local candidate pool 522 whose minimum experience levels are at least as high as the minimum experience level of the lowest level ($L_1$) maintained by the immediately up-chain EC 510 or 520 (or only from among those individuals with at least as high an experience level). Candidate harvesting module 618 also can apply further selection criteria as well in order to choose desirable individuals.

Referring to FIG. 7, the candidate pool 522 receives individuals both from the EC's up-chain EC and from its down-chain units. As mentioned, the mid-chain evolutionary coordinators 520 do not perform any of their own testing of candidate individuals, but instead coordinate the testing performed by their down-chain units. Thus mid-chain EC 520 includes a candidate delegation module 712 which selects individuals from its local candidate pool 522 for further testing. The candidate delegation module 712 selects the individuals using a round robin or random method, or any algorithm which tries to increase the experience level of all the individuals in the local candidate pool 522. The candidate delegation module 712 does not need to actively load-balance its down-chain units, since it only sends individuals down to a down-chain unit in response to a request from the down-chain unit for more individuals to test. In fact all communication in the arrangement of FIG. 5 is initiated by the down-chain units (though a different embodiment may operate differently).

Candidates being reported up from below are received by an aggregation module 716. Once a candidate is sent to a down-chain unit, the down-chain unit is required to report it back, even if it failed a competition below and is marked for discarding. Thus candidates received by aggregation module 716 are either individuals that failed below, in which case the mid-chain EC 520 discards the individual from its own local candidate pool 522, or individuals that survived their tests below and are among the fittest individuals that were in the down-chain unit's local candidate pool. Of the latter type, some may be returns of individuals that the EC 520 had previously sent down for further testing, and others may have originated from the down-chain unit or units. If an individual is a return of one that the EC 520 had previously sent down for further testing, then the aggregation module 716 aggregates the contribution that such further testing makes to the overall EC-centric fitness estimate before considering it for acceptance into the EC 520's local candidate pool 522. The aggregation involves subtracting from the experience level and fitness estimate reported for the returned individual, the individual's experience level and fitness estimate as indicated in the snapshot received with the returned individual, to arrive at the contribution made down-chain to the individual's training That contribution is then merged into the EC 520's own copy of the individual.

If the returned individual is either a new individual that originated below, or a returned individual that is proposed for acceptance into the EC 520's local candidate pool 522, the individual is required to compete for its place in the EC 520's local candidate pool 522. The competition is performed by competition module 714. As for the evolutionary engines 530, the competition module 714 also considers individuals from lower layers for promotion into higher layers in the local candidate pool 522, discards individuals that do not meet the minimum individual fitness of their target layer, and discards individuals that have been replaced in a layer by new entrants into that layer. Local candidate pool 522 is updated with the revised contents.

Evolutionary coordinator 520 also receives candidate individuals from its up-chain evolutionary coordinator 510 or 520 for further testing. These individuals are received by a candidate insertion module 722 in the mid-chain EC 520, but unlike the evolutionary engines 530, these individuals compete for entry into the local candidate pool 522. Received individuals arrive in conjunction with both their fitness estimates and their testing experience levels, and compete for entry into the EC 520's local candidate pool 522 against only those individuals which occupy the same experience layer in the local candidate pool 522. The candidate insertion module 722 also takes a snapshot of the received individuals for returning to the up-chain unit if and when it returns the individual after testing. As for the evolutionary engines 530, the received candidates retain their experience level and fitness estimates from above.

If one of the evolutionary units 520 or 530 receives from its up-chain EC 510 or 520, an individual for evaluation which it is already in the process of evaluating, then the receiving evolutionary unit it simply ignores the delegation. The receiving unit knows what individuals it is evaluating because it maintains a list of them, and where they came from, even if it has since further delegated evaluation to other units down-chain. Though the receiving unit has been told twice to evaluate the individual, the up-chain requestor will not be confused by receiving only one resulting report. The unit's report informs the up-chain requestor not only of the unit's testing results, but also the number of trials that the individual underwent under the control of the unit, and this information is used in the merging process performed by the requesting unit.

Sometime after the top layer of the local candidate pool 522 is full, individuals can be harvested for forwarding to the EC's own up-chain EC. Candidate harvesting module 718 retrieves individuals for that purpose. Preferably the candidate harvesting module 718 maintains a list of individuals ready for reporting up. It awakens periodically, and forwards all the individuals on the list up-chain. As mentioned, candidate harvesting module 718 preferably selects only from the layer or layers in the local candidate pool 522 whose minimum experience levels are at least as high as the minimum experience level of the lowest level ($L_1$) maintained by the immediately up-chain EC 510 or 520 (or only from among those individuals with at least as high an experience level). Candidate harvesting module 718 also can apply further selection criteria as well in order to choose desirable individuals. If the individuals had previously been received from the up-chain EC for testing, then candidate harvesting module 718 also forwards the snapshot that it took of the individual upon receipt.

Figure 8:
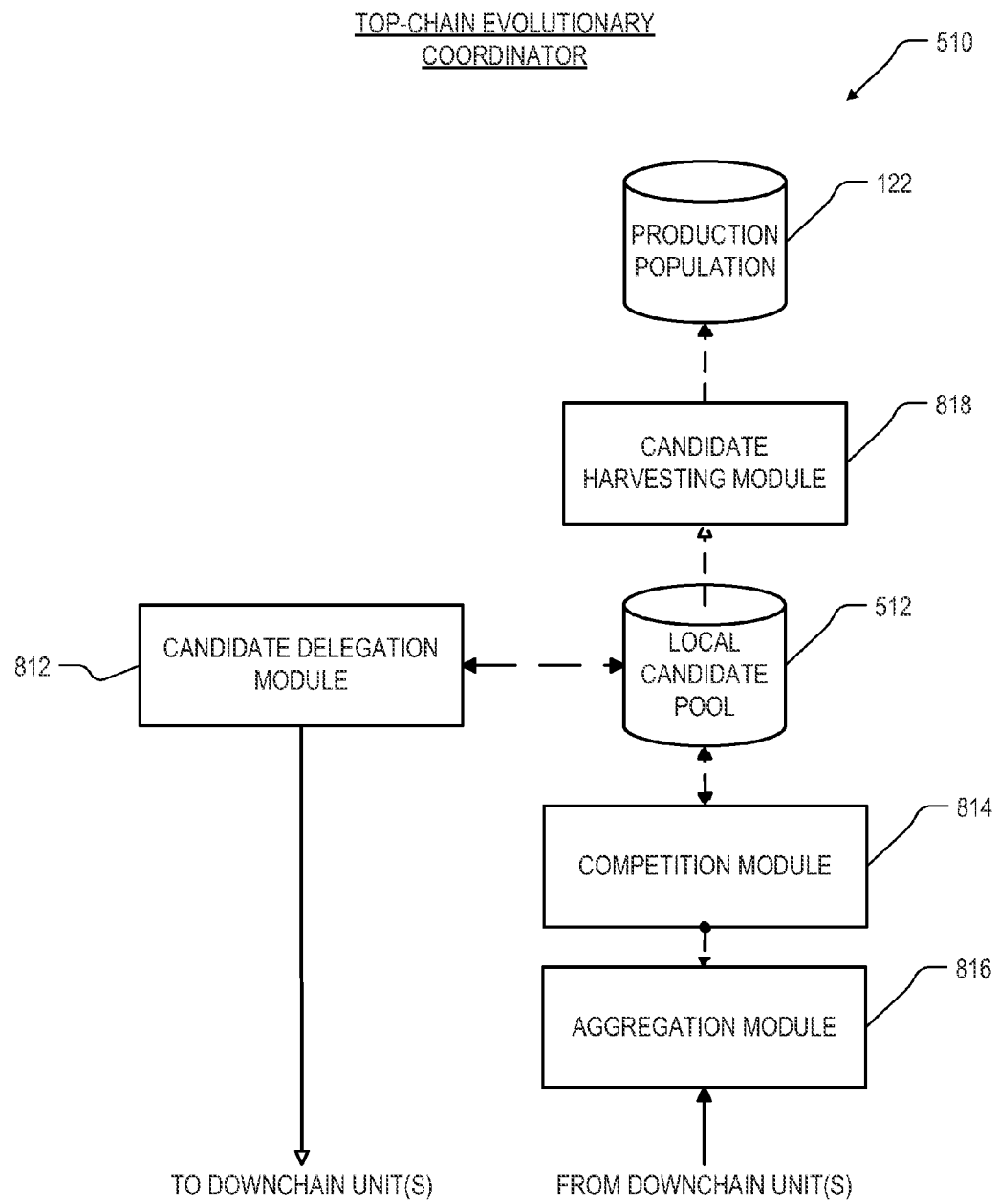
FIG. 8 illustrates various modules that can be used to implement the functionality of a top-chain evolutionary coordinator of FIG. 5.

FIG. 8 illustrates various modules that can be used to implement the functionality of a top-chain evolutionary coordinator 510. The top-chain EC's local candidate pool 512 is also shown in the drawing, as is the production population database 122. Most of the modules shown in FIG. 8 can in some embodiments operate asynchronously from each other.

As with the evolutionary engines 530 and mid-chain evolutionary coordinators 520, the top-chain evolutionary coordinator 510 also implements a local layered candidate pool as described above with respect to FIG. 2. Again the number of layers in the elitist pool, and the minimum and maximum experience levels of such layers, need not be the same as any or all of the down-chain units. Preferably, though, they span a generally higher set of experience levels than all the immediately down-chain units. Like the mid-chain EC's 520, top-chain EC 510 does not maintain any individuals in $L_0$, though it does prevent further testing of individuals in its top layer $L_T$.

More specifically, the local candidate pool 512 has multiple experience layers from its lowers layer $L_1$ to its highest layer $L_T$. Typically $L_1$ of the top-chain EC 510 has a testing experience range who's minimum experience level is higher than that of $L_1$ of each of the mid-chain EC's 520, though it could be equal in another embodiment. Individuals are harvested from only $L_T$ of the top-chain EC 510.

The modules in the top-chain evolutionary coordinator 510 are similar to those in the mid-chain EC's 520, except there is no candidate insertion module for inserting any individuals received from any up-chain neighbor. Instead, all individuals in the local candidate pool 512 were reported up from below.

Referring to FIG. 8, the candidate pool 512 receives individuals from the EC's down-chain units. Top-chain evolutionary coordinator 510 does not perform any of its own testing of candidate individuals, but instead coordinates the testing performed by the down-chain units. Thus top-chain EC 510 includes a candidate delegation module 812 which selects individuals from its local candidate pool 512 for further testing. The candidate delegation module 812 selects the individuals using any algorithm which tries to increase the experience level of all the individuals in the local candidate pool 512 other than those in the top layer $L_T$. The candidate delegation module 812 does not need to actively load-balance its down-chain units, since it only sends individuals down to a down-chain unit in response to a request from the down-chain unit for more individuals to test.

Candidates being reported up from below are received by an aggregation module 816. Similarly as described above for the mid-chain units 520, once the top-chain evolutionary coordinator 510 sends a candidate to a down-chain unit, the down-chain unit is required to report it back, even if the candidate failed a competition below and was discarded. Thus candidates received by aggregation module 816 are either individuals that failed below, in which case the top-chain EC 510 discards the individual from its own local candidate pool 512, or individuals that survived their tests below and are among the fittest individuals that were in the down-chain unit's local candidate pool. Of the latter type, some may be returns of individuals that the top-chain EC 510 had previously sent down for further testing, and others may have originated from a down-chain EE 530. If an individual is a return of one that the top-chain EC 510 had previously sent down for further testing, then the aggregation module 816 aggregates the contribution that such further testing makes to the overall EC-centric fitness estimate before considering it for acceptance in to the top-chain EC 510's local candidate pool 512. The aggregation methodology described above for the mid-chain EC's 520 can be used for the top-chain EC 510 as well.

If the returned individual is either a new individual that originated below, or a returned individual that is proposed for acceptance into the top-chain EC 510's local candidate pool 512, the individual is required to compete for its place in the EC 510's local candidate pool 512. The competition is performed by competition module 814. As for the evolutionary engines 530 and mid-chain evolutionary coordinators 520, the competition module 814 considers individuals from lower layers for promotion into higher layers in the local candidate pool 512, discards individuals that do not meet the minimum individual fitness of their target layer, and discards individuals that have been replaced in a layer by new entrants into that layer. Local candidate pool 512 is updated with the revised contents.

Sometime after the top layer of the local candidate pool 512 is full, candidate harvesting module 818 retrieves individuals for use in production. Candidate harvesting module 818 selects only from the top layer $L_T$ in the local candidate pool 512, and can apply further selection criteria as well in order to choose desirable individuals. For example, it can select only the fittest individuals from $L_T$, and/or only those individuals that have shown low volatility. Other criteria will be apparent to the reader. The individuals also typically undergo further validation as part of this further selection criteria, by testing on historical data not part of training data 114. The individuals selected by the candidate harvesting module 518 are written to the production population database 122 for use by production system 112 as previously described.

Note that because the evolutionary engines 530 are volunteer contributors to the system, they may go offline or lose communication with their up-chain units at any time. This may also be true of some mid-chain EC's 520 in some embodiments. Thus it is possible that some individuals that an EC 510 or 520 sent down-chain for further testing will never be returned to the sending EC. In this case the prior copy of the individual, retained by the EC, remains in place in its local candidate pool unless and until it is displaced through competition in the EC. Still further, note that an individual retained in an EC after it has also been sent to a down-chain unit for further testing, may become displaced and deleted from the EC through competition in the EC. In this case, if the same individual is returned by the down-chain unit, the EC simply ignores it.

As mentioned, competition modules 614, 714 and 814 manage the graduation of individuals from lower layers in the respective local candidate pool 532, 522 or 512, up to higher layers. This process can be thought of as occurring one individual at a time, as follows. First, a loop is begun through all individuals in the local candidate pool whose experience level has changed since the last time the competition module was executed. If the current individual's experience level has not increased sufficiently to qualify it for the next experience layer in the candidate pool, then the individual is ignored and the next one is considered. If the current individual's experience level has increased sufficiently to qualify it for a new experience layer, then the competition module determines whether the target experience layer is already at quota. If not, then the individual is simply moved into that experience level. If the target layer is full, then the competition module determines whether the fitness estimate of the current individual exceeds that of the least fit individual in the target layer. If so, then the least fit individual is discarded, and the current individual is moved up into the target layer. If not, then the current individual is discarded. The process then moves on to consider the next individual in sequence. Note that while individuals typically move up by only one experience layer at a time, that is not requirement in all embodiments. In some embodiments, such as where the top-chain EC 510 has received back an individual that has been tested on multiple batteries of trials under the governance of various mid-chain EC's 520, it may happen that a particular individual is not considered for advancement within the local candidate pool until after its experience level has increased sufficiently for it to jump past one or more experienced layers.

In an evolutionary unit that enforces an elitist pool minimum fitness (typically all of the EC's 510 and 520 in the embodiment of FIG. 5), the step in which the fitness estimate of the current individual is compared to the minimum fitness of the target layer, can further include a test of whether the current individual's fitness estimate satisfies the elitist pool minimum fitness. Typically this latter test is applied only on individuals entering $L_1$ in the particular evolutionary unit, but as mentioned previously, could be applied to individuals being considered for other layers in the local candidate pool as well. If the current individual does not satisfy the elitist pool minimum fitness, then it is discarded.

The above routine processes individuals sequentially, and different embodiments can implement different sequences for processing the individuals. Note that the processing sequence can affect the results if, for example, an individual in layer $L_i$ is being considered for layer $L_{i+1}$ at the same time that an individual in layer $L_{i-1}$ is being considered for layer $L_i$. If the former test occurs first, then a hole will be opened in layer $L_i$ and the individual graduating from layer $L_{i-1}$ will be promoted into layer $L_i$ automatically. If the latter test occurs first, then the individual graduating from layer $L_{i-1}$ will have to compete for its place in layer $L_i$ (assuming layer $L_i$ is at quota). In another embodiment, individuals are considered layer by layer either according to their target layer after promotion, or according to their current layer prior to promotion. Again, the sequence of individuals to consider within each layer will depend on the embodiment, as will the sequence in which the layers themselves are considered.

Figure 9:
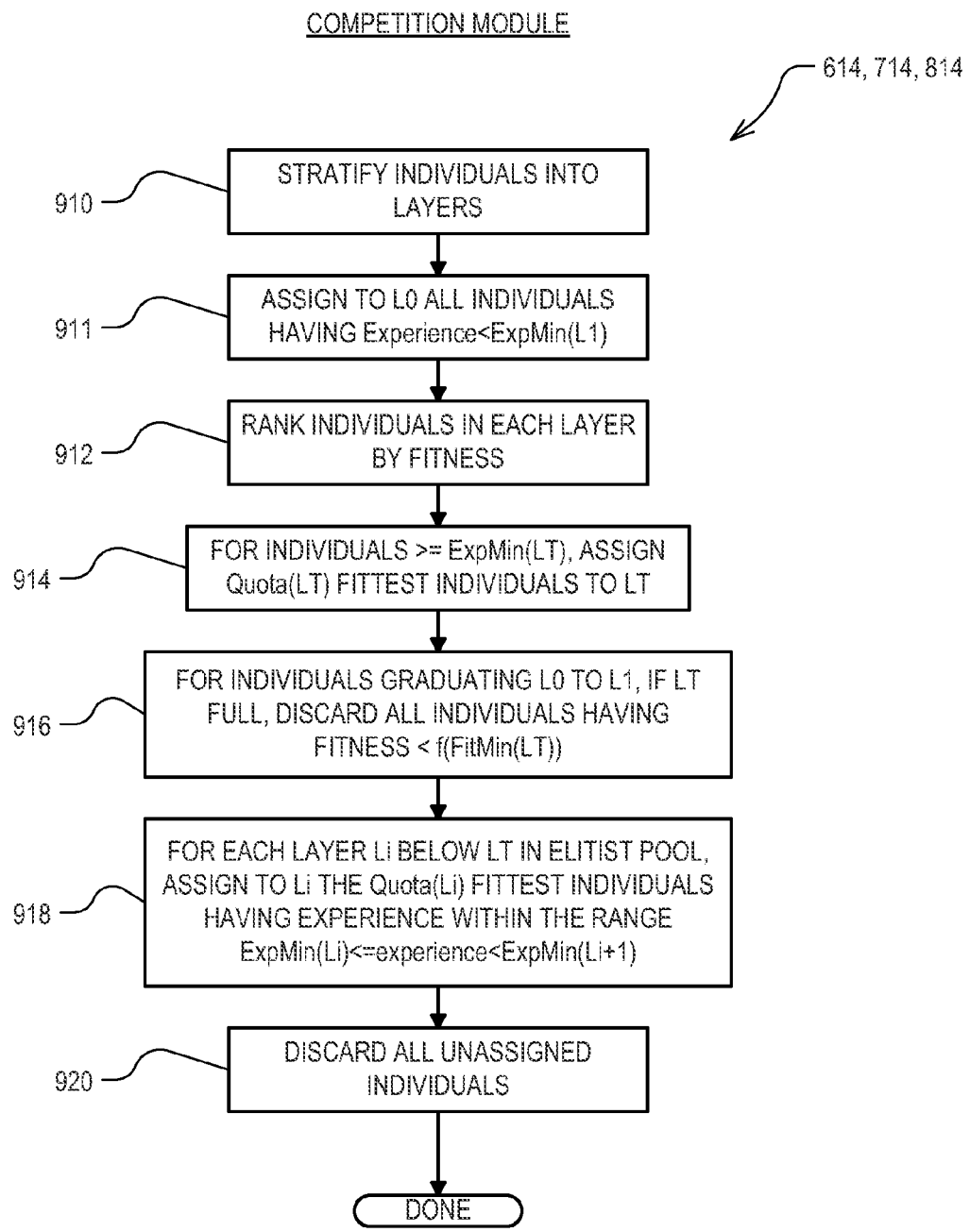
FIG. 9 illustrates a method of operation of the competition modules in FIGS. 6, 7 and/or 8.

Different evolutionary units can implement different competition algorithms. FIG. 9 illustrates a bulk-oriented method of operation of competition module 614, 714 or 814 (614 for example). In the embodiment of FIG. 9, the layers in the candidate pool 532 are disbanded and reconstituted each time the competition module 614 executes. These executions of competition module 614 are sometimes referred to herein as competition "events", and each comparison made between the fitness estimate of one individual and that of another is sometimes referred to herein as a comparison "instance".

In step 910, all the individuals in candidate pool (532 for competition module 614) are stratified into their experience layers. In step 911, all individuals whose experience level is still within that of $L_0$ in candidate pool 532, are assigned automatically to $L_0$. In step 912, within each experience layer $L_1$-$L_T$, the individuals are ranked according to their fitness estimates. In step 914, of those individuals whose experience level is at least equal to the minimum experience level of the top layer of the elitist pool in candidate pool 532, the Quota($L_T$) fittest are assigned to $L_T$. Note that this step could exclude some individuals with top layer experience, as individuals coming up from layer $L_{T-1}$ can supplant less fit individuals that were previously in $L_T$.

Step 916 implements the policy that once $L_T$ is full, no individuals are allowed into the elitist pool in candidate pool 532 unless they are at least as fit as some predetermined function f( ) of the top layer minimum fitness. In step 916, therefore, if $L_T$ in candidate pool 532 is full, all individuals graduating from $L_0$ to $L_1$ whose fitness estimate is less than f(FitMin($L_T$)) are discarded. Variations of step 916 to implement variations of the elitist pool minimum fitness policy, will be apparent. In step 918, for each layer $L_i$ below the top layer $L_T$, all the individuals in the elitist pool having experience level within the range associated with layer $L_i$ are considered. Of these individuals, only the Quota($L_i$) fittest individuals are assigned to layer $L_i$. In step 920, all individuals remaining in elitist pool in candidate pool 532 which were not assigned to specific layers in steps 911, 914 or 918, are discarded.

As used herein, a phrase such as "only the five fittest individuals", need not necessarily fill all five places. That is, if there are only three individuals to consider, the phrase is satisfied if all three individuals are assigned places. Thus it can be seen that step 918 includes both a policy that individuals entering a layer that is already at quota must compete for their place in that layer, as well as a policy that individuals entering a layer that is not yet full are promoted to that layer automatically. It can also be seen that steps 918 and 920 together implement a policy that fitness comparisons are made only among individuals having roughly the same experience.

Example Sequence

Given the above principles, the following is an example sequence of steps that might occur in the arrangement of FIG. 5 as individuals are created, tested, subjected to competition, evolved, and eventually harvested. Many steps are omitted as the system operates on numerous individuals and numerous evolutionary not mentioned herein. Many steps are omitted also in between the steps set forth, for purposes of clarity. In addition, for purposes of clarity several of the evolutionary units in FIG. 5 are referred to by shorthand abbreviations EC1, EC2, EC4, EE2, EE3, EE4, EE5, EE6 and TEC, all as indicated in FIG. 5.

EE2 creates candidates, including Individual #1, writes to local candidate pool

EE2 tests the candidates in local candidate pool, including discarding some through local competition, procreating to make new candidates, and creating new candidates randomly Individual #1 reaches top layer in local candidate pool EE2 transmits candidates from top layer, including Individual #1 and EE2's view of Individual #1's fitness level, to mid-chain EC1

EC1 accepts Individual #1 after competition against other candidates in EC1's local candidate pool. EC1's view of Individual #1's fitness level is now equal to EE2's view of Individual #1's fitness level. EC1 writes Individual #1 into L1 of local candidate pool with EC1's view of Individual #1's fitness level EC1 receives request from EE2 for candidates to test.

EC1 transmits candidates, including Individual #1, to EE2 for further testing.

EE2 inserts Individual #1 into EE2's local candidate pool.

EE2 tests the candidates in its local candidate pool, including Individual #1, including discarding some through local competition, procreating to make new candidates, and creating new candidates randomly. Individual #1 survives the completion.

Before receiving back Individual #1 from EE2, EC1 receives request from EE3 for candidates to test.

EC1 transmits candidates, again including Individual #1, to EE3 for further testing.

EE3 inserts Individual #1 into EE3's local candidate pool.

EE3 tests the candidates in its local candidate pool, including Individual #1, including discarding some through local competition, procreating to make new candidates, and creating new candidates randomly. Individual #1 survives.

Individual #1 reaches top layer in EE2's local candidate pool

EE2 transmits candidates from top layer, including Individual #1, to EC1 with its own view of Individual #1's updated fitness level.

EC1 accepts Individual #1 after competition against other candidates in EC1's local candidate pool. Writes Individual #1 into experience-appropriate layer of local candidate pool. Merges EE2's view of Individual #1's fitness level with EC1's view and writes updated view of Individual #1's fitness level into EC1's local candidate pool.

Individual #1 reaches top layer in EE3's local candidate pool

EE3 transmits candidates from top layer, including Individual #1, to EC1 with its own view of Individual #1's updated fitness level.

EC1 accepts Individual #1 after competition against other candidates in EC1's local candidate pool. Writes Individual #1 into experience-appropriate layer of local candidate pool. Merges EE3's view of Individual #1's fitness level with EC1's view and writes updated view of Individual #1's fitness level into EC1's local candidate pool.

EC1 sends request to top-chain TEC for candidates to test.

TEC transmits candidates, including Individual #2, to EC1 for further testing.

EC1 accepts Individual #2 after competition against other candidates in EC1's local candidate pool.

EC1 continues to coordinate further testing of the candidates in its local candidate pool, including Individual #1 and Individual #2, including delegating testing of Individual #1 and/or Individual #2 to EE2 and/or EE3, receiving them back after testing with new fitness estimates as viewed by EE2 and/or EE3, and discarding some through local competition with other candidates in EC1's local candidate pool.

Individual #1 and Individual #2 reach top layer in EC1's local candidate pool.

EC1 transmits candidates from top layer, including Individual #1 and Individual #2, to TEC with EC1's view of Individual #1's and Individual #2's updated fitness levels.

TEC accepts Individual #1 and Individual #2 after competition against other candidates in TEC local candidate pool. Writes Individual #1 and Individual #2 into L1 of local candidate pool. Merges EC1's view of Individual #2's fitness level with TEC's view and writes updated view of Individual #2's fitness level into TEC's local candidate pool. Since Individual #1 is new to TEC, TEC's view of Individual #1's fitness level is now equal to EC1's view of Individual #1's fitness level.

Mid-chain EC2 sends request to top-chain TEC for candidates to test.

TEC transmits candidates, including Individual #1, to EC2 for further testing.

EC2 accepts Individual #1 after competition against other candidates in EC2's local candidate pool.

Mid-chain EC4 sends request to EC2 for candidates to test.

EC2 transmits candidates, including Individual #1, to EC4 for further testing.

EC4 accepts Individual #1 after competition against other candidates in EC4's local candidate pool.

EE5 sends request to EC4 for candidates to test.

EE5 transmits candidates, including Individual #1, to EE5 for further testing.

EE5 inserts Individual #1 into EE5's local candidate pool.

EE5 tests the candidates in its local candidate pool, including Individual #1, including discarding some through local competition, procreating to make new candidates, and creating new candidates randomly Individual #1 reaches top layer in EE5's local candidate pool EE5 transmits candidates from top layer, including Individual #1, to EC4 with its own view of Individual #1's updated fitness level.

EC4 accepts Individual #1 after competition against other candidates in EC4's local candidate pool. Merges EE5's view of Individual #1's fitness level with EC4's view and writes updated view of Individual #1's fitness level into EC4's local candidate pool.

EC4 continues to coordinate further testing of the candidates in its local candidate pool, including Individual #1, including delegating testing of Individual #1 to EE5 and/or EE6, receiving them back after testing with new fitness estimates as viewed by EE5 and/or EE6, and discarding some through local competition with other candidates in EC4's local candidate pool.

Individual #1 reaches top layer in EC4's local candidate pool.

EC4 transmits candidates from top layer, including Individual #1, to EC2 with EC4's view of Individual #1's updated fitness levels.

EC2 accepts Individual #1 after competition against other candidates in EC2's local candidate pool. Writes Individual #1 into appropriate layer of local candidate pool. Merges EC4's view of Individual #1's fitness level with EC2's view and writes updated view of Individual #1's fitness level into EC2's local candidate pool.

EC2 continues to coordinate further testing of the candidates in its local candidate pool, including Individual #1, including delegating testing of Individual #1 to EE4 and/or EC4, receiving them back after testing with new fitness estimates as viewed by EE4 and/or EC4, and discarding some through local competition with other candidates in EC2's local candidate pool.

EC2 transmits candidates from top layer, including Individual #1, to TEC with EC2's view of Individual #1's updated fitness levels.

TEC accepts Individual #1 after competition against other candidates in TEC's local candidate pool. Writes Individual #1 into experience-appropriate layer of local candidate pool. Merges EC2's view of Individual #1's fitness level with TEC's view and writes updated view of Individual #1's fitness level into TEC's local candidate pool.

Individual #1 reaches top layer in TEC's local candidate pool.

Individual #1 is harvested for production population.

Computer Hardware

Figure 10:
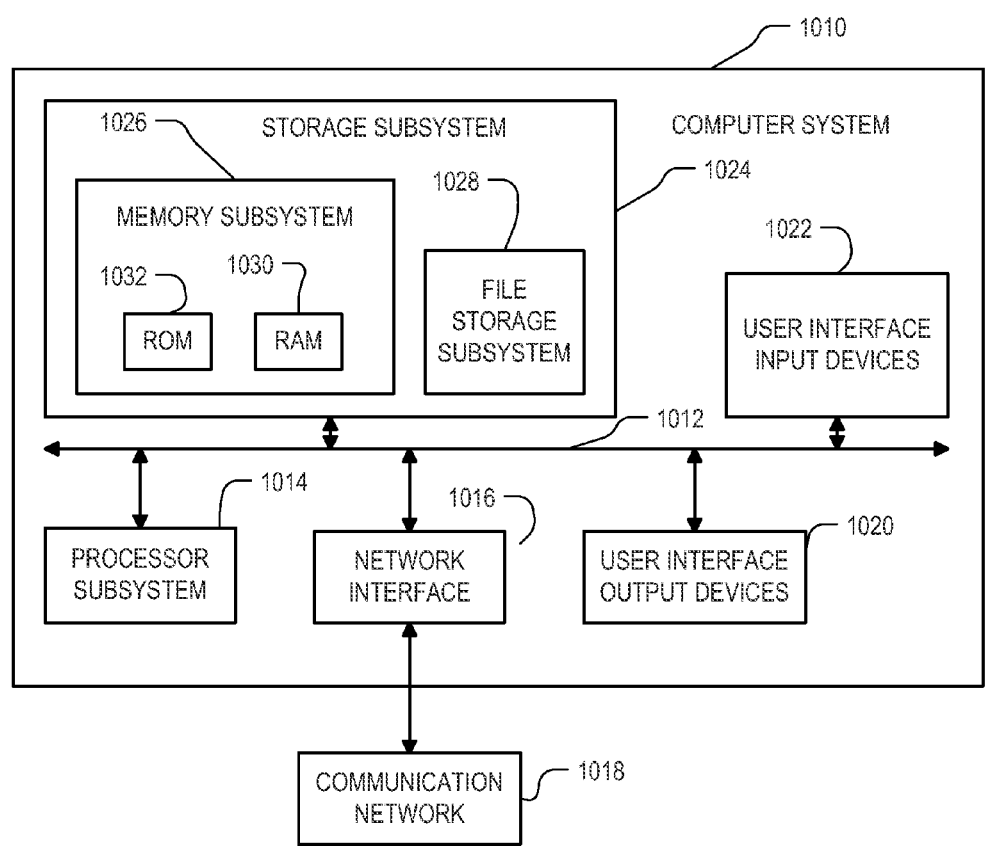
FIG. 10 is a simplified block diagram of a computer system that can be used to implement any or all of the evolutionary units, the production system, and the data feed server in FIGS. 1 and 5.

FIG. 10 is a simplified block diagram of a computer system 1010 that can be used to implement any or all of the evolutionary units 510, 520 and 530, the production system 112, and the data feed server 540. While FIGS. 6-9 indicate individual components for carrying out specified operations, it will be appreciated that each component actually causes a computer system such as 1010 to operate in the specified manner.

Computer system 1010 typically includes a processor subsystem 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. For the evolutionary units 510, 520 and 530, communication with the unit's up-chain and down-chain units occurs via communication network 1018. Communication network 1018 may comprise many interconnected computer systems and communication links. These communication links may be wireline links, optical links, wireless links, or any other mechanisms for communication of information. While in one embodiment, communication network 1018 is the Internet, in other embodiments, communication network 1018 may be any suitable computer network or combination of computer networks.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 1022 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 1010 or onto computer network 1018.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1010 to the user or to another machine or computer system. In particular, an output device of the computer system 1010 on which production system 112 is implemented, may include a visual output informing a user of action recommendations made by the system, or may include a communication device for communicating action signals directly to the controlled system 128. Additionally or alternatively, the communication network 1018 may communicate action signals to the controlled system 128. In the financial asset trading environment, for example, the communication network 1018 transmits trading signals to a computer system in a brokerage house which attempts to execute the indicated trades.

Storage subsystem 1024 stores the basic programming and data constructs that provide the functionality of certain embodiments of the present invention. For example, the various modules implementing the functionality of certain embodiments of the invention may be stored in storage subsystem 1024. These software modules are generally executed by processor subsystem 1014. Storage subsystem 1024 also stores the candidate pools 512, 522 or 532, as the case may be, for a respective evolutionary unit. For the data feed 540 storage subsystem 1024 may store the training database 114. For the top-chain EC 510 and/or for production system 112, storage subsystem 1024 may store the production population 122. Alternatively, one or more of such databases can be physically located elsewhere, and made accessible to the computer system 1010 via the communication network 1018.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 1028. The host memory 1026 contains, among other things, computer instructions which, when executed by the processor subsystem 1014, cause the computer system to operate or perform functions as described herein. As used herein, processes and software that are said to run in or on "the host" or "the computer", execute on the processor subsystem 1014 in response to computer instructions and data in the host memory subsystem 1026 including any other local or remote storage for such instructions and data.

As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD ROMs or a plurality of segments of RAM, or a combination of several different kinds of media. As used herein, the term does not include mere time varying signals in which the information is encoded in the way the signal varies over time.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer system 1010 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1010 depicted in FIG. 10 is intended only as a specific example for purposes of illustrating the preferred embodiments of the present invention. Many other configurations of computer system 1010 are possible having more or less components than the computer system depicted in FIG. 10.

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section or the Cross References section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A data mining arrangement, for use with a data mining training database containing training data, comprising a subject processing unit,
   for use with a plurality of processing units including a first unit disposed up-chain from the subject unit, and a plurality of client units including a particular one of the client units disposed down-chain from the subject unit,
   wherein the subject unit includes a subject processor and a subject memory, the subject memory storing a local pool of candidate individuals, each of the candidate individuals identifying at least one classification rule and further identifying a respective fitness estimate centric to the subject unit,
   and wherein the subject processor is configured to:
      store in the subject memory individuals received by the subject unit from the first unit, for evaluation against a portion of the training data,
      delegate, to the particular client unit, evaluation of individuals from the subject unit's local pool of candidate individuals,
      update the fitness estimates, centric to the subject unit, for selected ones of individuals received back from the particular client unit after testing, in dependence upon the results of such testing, and
      report to the first unit, selected individuals from the subject memory in conjunction with the individuals' fitness estimates, centric to the subject unit.

2. The arrangement of claim 1, for use further where the plurality of client units further includes an additional client unit,
   wherein the subject processor is further configured to:
      delegate, to the additional client unit, evaluation of individuals from the subject unit's local pool of candidate individuals,
      update the fitness estimates, centric to the subject unit, for selected ones of individuals received back from the additional client unit after testing, in dependence upon the results of such testing.

3. The arrangement of claim 2, wherein one of the individuals that the subject processor delegates to the particular client unit is the same as one of the individuals that the subject processor delegates to the additional client unit.

4. The arrangement of claim 1, further comprising an additional unit which is among the plurality of processing units, the additional unit being disposed down-chain from the first unit and up-chain from an additional one of the client units,
  wherein the additional unit includes an additional processor and an additional memory, the additional memory storing an additional local pool of candidate individuals, each of the candidate individuals in the additional memory identifying at least one classification rule and further identifying a respective fitness estimate centric to the additional unit,
  and wherein the additional processor is configured to:
    store in the additional memory individuals received by the additional unit from the first unit, for evaluation against a portion of the training data,
    delegate, to the additional client unit, evaluation of individuals from the additional unit's local pool of candidate individuals,
    update the fitness estimates, centric to the additional unit, for selected ones of individuals received back from the additional client unit after testing, in dependence upon the results of such testing, and
    report to the first unit, selected individuals from the additional memory in conjunction with the individuals' fitness estimates, centric to the additional unit.

5. The arrangement of claim 1, further comprising the first unit, for use further where the plurality of processing units further includes a further unit, disposed up-chain from the first unit,
  wherein the first unit includes a first processor and a first memory, the first memory storing a first local pool of candidate individuals, each of the candidate individuals in the first memory identifying at least one classification rule and further identifying a respective fitness estimate centric to the first unit,
  and wherein the first processor is configured to:
    store in the first memory individuals received by the first unit from the further unit, for evaluation against a portion of the training data,
    delegate, to the subject unit, evaluation of individuals from the first unit's local pool of candidate individuals,
    update the fitness estimates, centric to the first unit, for selected ones of individuals received back from the subject unit after testing, in dependence upon the results of such testing, and
    report to the further unit, selected individuals from the first memory in conjunction with the individuals' fitness estimates, centric to the first unit.

6. The arrangement of claim 1, further comprising the particular client unit,
  wherein the particular client unit includes a particular processor and a particular memory, the particular memory storing a local pool of candidate individuals, each of the candidate individuals identifying at least one classification rule and further identifying a respective fitness estimate centric to the particular unit and a respective testing experience level centric to the particular unit,
  and wherein the particular processor is configured to:
    store in the subject memory individuals received by the particular unit from the subject unit, for evaluation against a portion of the training data,
    test individuals from the particular unit's local pool of candidate individuals,
    update the fitness estimates, centric to the particular unit, for selected ones of individuals tested, in dependence upon the results of such testing, and
    report to the subject unit, selected individuals from the particular memory in conjunction with the individuals' fitness estimates and testing experience levels, centric to the particular unit.

7. The arrangement of claim 1, wherein each of the candidate individuals in the subject memory further identifies a respective testing experience level centric to the subject unit,
  wherein the subject memory further identifies parameters for each of a plurality of consecutively increasing ranges of candidate testing experience levels, from a first range to a top range,
  and wherein in the subject processor is further configured to select individuals for discarding from the local pool, in dependence upon their fitness estimates relative to the fitness estimates of the other individuals within the same testing experience range.

8. The arrangement of claim 7, further comprising the particular client unit,
  wherein the particular client unit includes a particular processor and a particular memory, the particular memory storing a local pool of candidate individuals, each of the candidate individuals identifying at least one classification rule and further identifying a respective fitness estimate centric to the particular unit and a respective testing experience level centric to the particular unit,
  wherein the particular memory further identifies parameters for each of a plurality of consecutively increasing ranges of candidate testing experience levels,
  and wherein the particular processor is configured to:
    store in the subject memory individuals received by the particular unit from the subject unit, for evaluation against a portion of the training data,
    test individuals from the particular unit's local pool of candidate individuals,
    update the fitness estimates, centric to the particular unit, for selected ones of individuals tested, in dependence upon the results of such testing,
    select individuals for discarding from the particular unit's local pool, in dependence upon their fitness estimates relative to the fitness estimates of the other individuals in the particular unit's local pool which are within the same testing experience range, and
    report to the subject unit, selected individuals from the particular memory in conjunction with the individuals' fitness estimates and testing experience levels, centric to the particular unit.

9. The arrangement of claim 8, wherein the consecutively increasing ranges of candidate testing experience levels in the particular memory extends from a lowest range the minimum testing experience level of which is below that of the first testing experience range in the subject memory, to a top range the minimum testing experience level of which is at least as high as that of the first testing experience range in the subject memory.

10. The arrangement of claim 9, wherein the subject processor is configured to, in delegating to the particular client unit, evaluation of individuals from the subject unit's local pool of candidate individuals, delegate only individuals from the subject unit's ranges of candidate testing experience levels.

11. The arrangement of claim 9, wherein the particular processor is configured to, in reporting to the subject unit, selected individuals from the particular memory, reports only individuals having a testing experience level centric to the particular unit whose testing experience levels are at least as high as the minimum testing experience level of the first testing experience range in the subject memory.

12. The arrangement of claim 11, wherein the subject processor is configured to, in delegating to the particular client unit, evaluation of individuals from the subject unit's local pool of candidate individuals, delegate only individuals from the subject unit's ranges of candidate testing experience levels.

13. The arrangement of claim 7, further comprising the first unit,
wherein the first unit includes a first processor and a first memory, the first memory storing a first local pool of candidate individuals, each of the candidate individuals in the first memory identifying at least one classification rule and further identifying a respective fitness estimate centric to the first unit and a respective testing experience level centric to the first unit,
wherein the first memory further identifies parameters for each of a plurality of consecutively increasing ranges of candidate testing experience levels, from a first range to a top range,
wherein the first processor is configured to:
store individuals in the first memory,
delegate, to the subject unit, evaluation of individuals from the first unit's local pool of candidate individuals,
update the fitness estimates, centric to the first unit, for selected ones of individuals received back from the subject unit after testing, in dependence upon the results of such testing, and
select individuals for discarding from the first unit's local pool, in dependence upon their fitness estimates relative to the fitness estimates of the other individuals in the first unit's local pool which are within the same testing experience range,
and wherein the consecutively increasing ranges of candidate testing experience levels in the subject memory extends from a lowest range the minimum testing experience level of which is below that of the first testing experience range in the first memory, to a top range the minimum testing experience level of which is at least as high as that of the top testing experience range in the subject memory.

14. A data mining arrangement, for use with a data mining training database containing training data, comprising an evolutionary coordinator infrastructure,
the evolutionary coordinator infrastructure including:
a top-chain evolutionary coordinator; and
a set of at least one mid-chain evolutionary coordinator, each of the mid-chain coordinators being immediately down-chain to another respective one of the evolutionary coordinators, at least one of the mid-chain coordinators being immediately down-chain to the top-chain coordinator,
for use with a set of at least one evolutionary engine each being an evolutionary unit immediately down-chain to a respective one of the evolutionary coordinators,
wherein each particular one of the evolutionary coordinators includes a processor and a memory, the memory storing a local pool of candidate individuals, each of the candidate individuals identifying at least one classification rule and further identifying a respective fitness estimate centric to the particular evolutionary coordinator,
wherein the processor of each given one of the mid-chain evolutionary coordinators is configured to:
store in the memory of the given coordinator individuals received by the given coordinator from its up-chain coordinator, for evaluation against a portion of the training data,
delegate, to a unit down-chain of the given coordinator, evaluation of individuals from the given coordinator's local pool of candidate individuals,
update the fitness estimates, centric to the given coordinator, for selected ones of individuals received back from the down-chain unit after testing, in dependence upon the results of such testing, and
report to the given coordinator's up-chain coordinator, selected individuals from the memory of the given coordinator in conjunction with the individuals' fitness estimates, centric to the given coordinator.

15. The arrangement of claim 14, wherein each of the candidate individuals in the memory of each particular one of the evolutionary coordinators further identifies a respective testing experience level centric to the particular evolutionary coordinator,
wherein the memory of each particular one of the evolutionary coordinators further identifies parameters for each of a plurality of consecutively increasing ranges of candidate testing experience levels, from a first range of the particular coordinator to a top range of the particular coordinator,
and wherein in the processor of each particular one of the evolutionary coordinators is further configured to select individuals for discarding from the local pool, in dependence upon their fitness estimates relative to the fitness estimates of the other individuals within the same testing experience range of the particular coordinator.

16. The arrangement of claim 15, wherein the consecutively increasing ranges of candidate testing experience levels in the memory of each given one of the mid-chain evolutionary coordinators extends up to a top range the minimum testing experience level of which is at least as high as that of the top testing experience range in the memory of the evolutionary coordinator immediately up-chain from the given mid-chain evolutionary coordinator.

17. The arrangement of claim 16, wherein the processor of the top-chain evolutionary coordinator is configured to:
store individuals in the memory of the top-chain evolutionary coordinator;
update the fitness estimates, centric to the top-chain evolutionary coordinator, for selected ones of individuals that it receives from mid-chain evolutionary coordinators, in dependence upon testing the individuals by down-chain evolutionary units; and
select individuals for discarding from the top-chain evolutionary coordinator's local pool, in dependence upon their fitness estimates relative to the fitness estimates of the other individuals in the top-chain evolutionary coordinator's local pool which are within the same testing experience range.

18. The arrangement of claim 16, further comprising the evolutionary engines,
wherein each particular one of the evolutionary engines includes a processor and a memory, the memory of the particular evolutionary engine storing a local pool of candidate individuals, each of the candidate individuals identifying at least one classification rule and further identifying a respective fitness estimate centric to the particular evolutionary engine and a respective testing experience level centric to the particular evolutionary engine, wherein the memory of the particular evolutionary engine further identifies parameters for each of a plurality of consecutively increasing ranges of candidate testing experience levels for the particular evolutionary engine, and wherein the processor of the particular evolutionary engine is configured to:

store in the memory of the particular evolutionary engine individuals received by the particular evolutionary engine from its immediately up-chain evolutionary coordinator, for evaluation against a portion of the training data, test individuals from the particular evolutionary engine's local pool of candidate individuals, update the fitness estimates, centric to the particular evolutionary engine, for selected ones of individuals tested, in dependence upon the results of such testing, select individuals for discarding from the particular evolutionary engine's local pool, in dependence upon their fitness estimates relative to the fitness estimates of the other individuals in the particular evolutionary engine's local pool which are within the same testing experience range, and report to the evolutionary coordinator immediately up-chain of the particular evolutionary engine, selected individuals from the memory of the particular evolutionary engine, in conjunction with the individuals' fitness estimates and testing experience levels, centric to the particular evolutionary engine, wherein the consecutively increasing ranges of candidate testing experience levels in the memory of the particular evolutionary engine extends from a lowest range the minimum testing experience level of which is below that of the lowest testing experience range in the evolutionary coordinator immediately up-chain of the particular evolutionary engine, to a top range the minimum testing experience level of which is at least as high as that of the lowest testing experience range in the evolutionary coordinator immediately up-chain of the particular evolutionary engine.

19. A computer-implemented data mining arrangement, for use with a data mining training database containing training data, a top-chain evolutionary coordinator, and a set of at least one evolutionary engine each being down-chain of the top-chain evolutionary coordinator, comprising:

a mid-chain evolutionary coordinator being down-chain of the top-chain coordinator and up-chain of the evolutionary engines, the mid-chain evolutionary coordinator including:

a memory storing a local pool of candidate individuals, each of the candidate individuals identifying a set of at least one classification rule and further identifying a respective fitness estimate centric to the mid-chain evolutionary coordinator, a receiving module which receives individuals to be tested;

a delegation module which forwards selected ones of the individuals from the mid-chain evolutionary coordinator's pool down-chain toward at least one of the evolutionary engines for testing;

a competition module which
receives back individuals tested by the evolutionary engines, in conjunction with an indication of the results of such testing,
updates the mid-chain evolutionary coordinator's fitness estimates of the received individuals in dependence upon the results of such testing, and
selects individuals for discarding in dependence upon their updated fitness estimates; and a candidate harvesting module which forwards selected ones of the individuals from the mid-chain evolutionary coordinator's candidate pool up-chain toward the top-chain evolutionary coordinator.

20. The arrangement of claim 19, wherein the mid-chain evolutionary coordinator does not itself test any individuals.

21. The arrangement of claim 19, wherein the competition module further selects individuals for discarding, in dependence upon their fitness estimates, upon receipt of individuals by the receiving module, and wherein the receiving module inserts into the mid-chain evolutionary coordinator's candidate pool, only those received individuals not selected by the competition module for discarding.

22. The arrangement of claim 19, wherein each of the candidate individuals in the local pool of candidate individuals further identifies a respective testing experience level centric to the mid-chain evolutionary unit, wherein the memory of the mid-chain evolutionary coordinator further identifies parameters for each of a plurality of consecutively increasing ranges of candidate testing experience levels, from a first range to a top range, and wherein in the competition module, in selecting individuals for discarding in dependence upon their updated fitness estimates, selects the individuals for discarding, in dependence upon their fitness estimates relative to the fitness estimates of the other individuals within the same testing experience range.

23. The arrangement of claim 22, wherein the top-chain evolutionary coordinator includes a memory storing a local pool of candidate individuals, and further identifies parameters for each of a plurality of consecutively increasing ranges of candidate testing experience levels, from a first range to a top range, and wherein the top range of candidate testing experience levels in the mid-chain evolutionary coordinator has a minimum experience level which is at least as high as a minimum experience level of the top range of candidate testing experience levels in the top-chain evolutionary coordinator.

24. The arrangement of claim 23, wherein the top-chain evolutionary coordinator includes a competition module which selects individuals that are received from evolutionary units down-chain of the top-chain evolutionary coordinator, for discarding in dependence upon their fitness estimates relative to the fitness estimates of the other individuals within the same testing experience range of the top-chain evolutionary coordinator.

25. A computer-implemented data mining arrangement, for use with a data mining training database containing training data, comprising:

a set of evolutionary units including
a top-chain evolutionary coordinator,
a set of at least one mid-chain evolutionary coordinator, each of the mid-chain coordinators being immediately down-chain to another respective one of the evolutionary coordinators, at least one of the mid-chain coordinators being immediately down-chain to the top-chain coordinator; and a set of at least one evolutionary engine each being immediately down-chain to a respective one of the evolutionary coordinators, each of the evolutionary units including a memory storing a respective pool of candidate individuals, each of the candidate individuals identifying a set of at least one classification rule and further identifying a respective fitness estimate centric to the evolutionary unit, each of the evolutionary engines further including a module which receives individuals to be tested;

a candidate pool processor which tests, on at least a portion of the training data, individuals from the engine's pool, and updates the tested individuals' fitness estimates in the engine's pool in dependence upon the tests; and a candidate harvesting module which forwards selected ones of the individuals from the engine's pool to the engine's up-chain evolutionary coordinator, each of the mid-chain evolutionary coordinators including a module which receives individuals to be tested;

a delegation module which forwards selected ones of the individuals from the coordinator's pool to its down-chain units for testing;

a competition module which receives back individuals from the down-chain units after testing, in conjunction with an indication of the results of such testing, updates the coordinator's fitness estimates of the received individuals in dependence upon the results of such testing, and selects individuals for discarding in dependence upon their updated fitness estimates; and a candidate harvesting module which forwards selected ones of the individuals from the coordinator's pool to the coordinator's up-chain evolutionary coordinator, and the top-chain evolutionary coordinator including a delegation module which forwards selected ones of the individuals from the coordinator's pool to its down-chain units for testing;

a competition module which receives back individuals from the down-chain units after testing, in conjunction with an indication of the results of such testing, updates the coordinator's fitness estimates of the received individuals in dependence upon the results of such testing, and selects individuals for discarding in dependence upon their updated fitness estimates; and a candidate harvesting module which provides for deployment selected ones of the individuals from the coordinator's pool.

26. A data mining method, for use with a data mining training database containing training data, comprising:

a first one of the evolutionary coordinators receiving from an up-chain evolutionary coordinator a first individual for testing on training data, the first individual having associated therewith an indication of a fitness estimate as viewed by the first evolutionary coordinator;

the first evolutionary coordinator delegating the first individual to a second evolutionary unit down-chain of the first evolutionary coordinator, for testing on training data;

the first evolutionary coordinator receiving the first individual back from the second evolutionary unit after testing on training data and updating the first evolutionary coordinator's view of the individual's fitness estimate in dependence upon results of the testing;

the first evolutionary coordinator causing the first individual to compete on the basis of its updated fitness estimate with other individuals for a place in a candidate pool of the first evolutionary coordinator;

the first evolutionary coordinator retaining the first individual in the candidate pool of the first evolutionary coordinator if the first individual competed successfully; and the first evolutionary coordinator returning the first individual to the up-chain evolutionary coordinator in conjunction with the updated fitness estimate.

27. The arrangement of claim 25, wherein at least two of the evolutionary engines are both immediately down-chain of a particular one of the evolutionary coordinators.

28. The arrangement of claim 27, wherein the particular evolutionary coordinator is the top-chain evolutionary coordinator.

29. The arrangement of claim 27, wherein the particular evolutionary coordinator is a mid-chain evolutionary coordinator.

30. The arrangement of claim 25, wherein one of the mid-chain evolutionary coordinators is immediately down-chain of a second one of the mid-chain evolutionary coordinators.

31. The arrangement of claim 25, wherein one of the mid-chain evolutionary coordinators is immediately up-chain of both a second one of the mid-chain evolutionary coordinators, and one of the evolutionary engines.

32. The arrangement of claim 25, wherein the top-chain evolutionary coordinator is immediately up-chain of both a one of the mid-chain evolutionary coordinators, and one of the evolutionary engines.

33. The arrangement of claim 32, wherein the top-chain evolutionary coordinator is also immediately up-chain of a second one of the mid-chain evolutionary coordinators.

34. The arrangement of claim 32, wherein the top-chain evolutionary coordinator is also immediately up-chain of a second one of the evolutionary engines.

35. The arrangement of claim 25, wherein at least one of the evolutionary units further includes a procreation module which forms new individuals in dependence upon a respective set of at least one parent individual from the unit's pool.

36. The arrangement of claim 35, wherein all evolutionary units in the arrangement that include a procreation module which forms new individuals in dependence upon a respective set of at least one parent individual from the unit's pool, are evolutionary engines.

37. The arrangement of claim 25, wherein at least one of the evolutionary engines further includes a creation module which creates non-procreated individuals and inserts them into the engine's pool.

38. The arrangement of claim 37, wherein the creation module creates the non- procreated individuals randomly.

39. The method of claim 26, wherein the first evolutionary coordinator discards the first individual in response to the first individual failing the competition.

40. The method of claim 26, further comprising:

the first evolutionary coordinator delegating the first individual further to a third evolutionary unit down-chain of the first evolutionary coordinator, for additional testing on training data;

the first evolutionary coordinator receiving the first individual back from the third evolutionary unit after testing on training data and updating the first evolutionary coordinator's view of the individual's fitness estimate in dependence upon results of the additional testing;

the first evolutionary coordinator causing the first individual to compete a second time on the basis of its updated fitness estimate with other individuals for a place in the candidate pool of the first evolutionary coordinator;

the first evolutionary coordinator retaining the first individual in the candidate pool of the first evolutionary coordinator if the first individual competed successfully in the second competition.

41. The method of claim 40, wherein delegation of the first individual further to a third evolutionary unit occurs after delegation of the first individual to the second evolutionary unit and before the first evolutionary coordinator receives the first individual back from the second evolutionary unit.

42. The method of claim 26, further comprising:

in response to receipt of the first individual by the second evolutionary unit, the second evolutionary unit delegating the first individual to a third evolutionary unit down-chain of the second evolutionary unit, for testing on training data;

the second evolutionary unit receiving the first individual back from the third evolutionary unit after testing on training data and updating the second evolutionary unit's view of the first individual's fitness estimate in dependence upon results of the testing;

the second evolutionary unit causing the first individual to compete on the basis of its updated fitness estimate with other individuals for a place in a candidate pool of the second evolutionary unit;

the second evolutionary unit retaining the first individual in the candidate pool of the second evolutionary unit if the first individual competed successfully; and the second evolutionary unit returning the first individual to the first evolutionary coordinator in conjunction with the second evolutionary unit's view of the first individual's updated fitness estimate.

43. The method of claim 26, further comprising:

an evolutionary engine down-chain of the first evolutionary coordinator receiving the first individual for testing on training data, testing the first individual on training data, developing an updated fitness estimate of the first individual as viewed by the evolutionary engine, and returning the first individual, in conjunction with an indication of the evolutionary engine's view of the updated fitness estimate, up-chain toward the first evolutionary coordinator.

44. The method of claim 26, further comprising providing the first individual for deployment.

* * * * *